United States Patent
Esmaili et al.

(10) Patent No.: US 10,746,470 B2
(45) Date of Patent: Aug. 18, 2020

(54) METHOD OF OPERATING A FURNACE

(71) Applicant: Air Products and Chemicals, Inc., Allentown, PA (US)

(72) Inventors: Ali Esmaili, Mercer Island, WA (US); Hu Li, Mountain View, CA (US); Matthew James Labuda, Fogelsville, PA (US); Joshua David Isom, Allentown, PA (US)

(73) Assignee: Air Products & Chemicals, Inc., Allentown, PA (US)

( * ) Notice: Subject to any disclaimer, the term of this patent is extended or adjusted under 35 U.S.C. 154(b) by 244 days.

(21) Appl. No.: 15/962,480

(22) Filed: Apr. 25, 2018

(65) Prior Publication Data
US 2019/0003772 A1    Jan. 3, 2019

Related U.S. Application Data

(60) Provisional application No. 62/526,442, filed on Jun. 29, 2017.

(51) Int. Cl.
| | |
|---|---|
| *F27D 19/00* | (2006.01) |
| *F27D 21/02* | (2006.01) |
| *G05B 13/04* | (2006.01) |
| *F27D 21/00* | (2006.01) |

(52) U.S. Cl.
CPC ......... *F27D 19/00* (2013.01); *F27D 21/0014* (2013.01); *F27D 21/02* (2013.01); *G05B 13/042* (2013.01); *F27D 2019/0003* (2013.01)

(58) Field of Classification Search
CPC ... G05B 13/042; F27D 21/0014; F27D 19/00; F27D 21/02; F27D 2019/0003

USPC ........ 700/266, 271, 272, 742; 436/143, 159, 436/136, 160; 422/78, 177, 180, 182, 422/183, 204, 643, 223; 110/185, 186, 110/101 C, 101 CF
See application file for complete search history.

(56) References Cited

U.S. PATENT DOCUMENTS

| | | | |
|---|---|---|---|
| 4,751,571 A | 6/1988 | Lillquist | |
| 5,764,535 A * | 6/1998 | Okazaki et al. | ............. 700/274 |
| 5,782,770 A | 7/1998 | Mooradian et al. | |
| 6,184,792 B1 * | 2/2001 | Privalov et al. | ............. 340/578 |
| 8,219,247 B2 | 7/2012 | Esmaili et al. | |
| 2003/0123518 A1 | 7/2003 | Abbasi et al. | |

(Continued)

FOREIGN PATENT DOCUMENTS

WO       2007056004 A1    5/2007

OTHER PUBLICATIONS

Hill, T., "On-Line Optimization and Reliability Monitoring of Your Synthesis Gas Plant: Fact or Fiction", 10th IMPCA Asian Methanol Conference 2007, May 10, 2007.

*Primary Examiner* — Shogo Sasaki
(74) *Attorney, Agent, or Firm* — Matthew R. Weaver

(57) ABSTRACT

A method of operating a furnace having process tubes and multiple burners where it is desired to conform the temperatures of the process tubes to selected target temperature criterion. The present method provides a systematic and quantitative approach to determine how to adjust burner flow rates to result in desired tube wall temperatures, for example, using objective functions to decrease the probability that temperatures pertaining to the plurality of process tubes exceed their selected limit temperatures. An objective function can also be used to reduce the excess oxidant requirement for the furnace.

12 Claims, 5 Drawing Sheets

(56) References Cited

U.S. PATENT DOCUMENTS

| | | | |
|---|---|---|---|
| 2004/0044423 A1* | 3/2004 | Wintrich et al. | 700/29 |
| 2004/0191914 A1* | 9/2004 | Widmer et al. | 436/55 |
| 2004/0236229 A1 | 11/2004 | Freeman et al. | |
| 2005/0267703 A1* | 12/2005 | Bondurant et al. | 702/81 |
| 2006/0015298 A1* | 1/2006 | Daw et al. | 702/188 |
| 2006/0049352 A1 | 3/2006 | Irani | |
| 2007/0104641 A1* | 5/2007 | Ahmed et al. | 423/652 |
| 2008/0081302 A1* | 4/2008 | Wintrich et al. | 431/12 |
| 2009/0017406 A1* | 1/2009 | Farias Fuentes et al. | 431/76 |
| 2010/0132179 A1* | 6/2010 | Furtado et al. | 29/402.08 |

* cited by examiner

METHOD OF OPERATING A FURNACE

CROSS-REFERENCE TO RELATED APPLICATIONS

This patent application claims priority from Provisional Application Ser. No. 62/526,442, titled "Method of Operating a Furnace," filed on 29 Jun. 2017, the contents of which are hereby incorporated by reference.

BACKGROUND

The present disclosure is directed to operation of a furnace having a plurality of burners and containing a plurality of process tubes. In particular, the present disclosure is directed to operation of a furnace having a plurality of burners and containing a plurality of process tubes with improved reliability and efficiency.

Steam hydrocarbon (steam methane) reformers are furnaces containing numerous process tubes (including configurations with more than 400 reactor tubes), each tube containing catalyst (for example, a reforming catalyst) for transporting a process fluid (for example, steam and a hydrocarbon). The furnace, for example, can include vertically extending process tubes positioned in parallel rows with about 30 to 60 tubes in each row. The distance between two rows of tubes is about 2 to 3 meters. The tubes can extend vertically about 12 meters and have an outer diameter of 100 to 150 millimeters. The tubes can be positioned in the row with a center-to-center spacing of 250 to 500 mm. About 10 to 20 burners can be positioned between each set of two rows of tubes. A total of eight or more rows of tubes and nine or more rows of burners can be included in a furnace.

Generally, energy efficiency for industrial processes is becoming more important. For many processes, such as hydrogen production, the efficiency of the process is related to the ability to monitor and regulate certain temperatures. Measuring temperatures of reformer tubes in a reformer furnace can present several challenges. For example, when measuring temperatures at specific locations on the reformer tubes, inconsistency in taking the measurements at the specific location of the reformer tube can result in measurements with greater uncertainty. More precise monitoring of the temperature at the specific location on the reformer tube can permit improved energy efficiency by permitting more accurate data to be used for process control.

Furnace tube temperatures may vary along the length. The tubes may get hotter in the direction of the process flow as the process stream picks up heat from the furnace. Process tubes may cool due to endothermic reaction even as heat is added from the furnace. This axial variation is part of the process. Traditional methods of furnace control require a measure of temperature. This can be a tube wall temperature, a process gas temperature or a combustion gas temperature (or some combination). In traditional methods of furnace control, the overall flow of fuel (or in some cases oxidant or inerts) is adjusted to control the temperature as described in U.S. Pat. Publ. US2007/0104641. Adjustments also may be made to control the axial temperature profile.

Tube temperature may also vary from one tube to another. If there is axial variation it is necessary to compare tubes at the same axial position to determine the tube-to-tube variability. There may be operational benefits to reducing the tube-to-tube variability or to controlling the variability. The methods described here are intended to address the issue of tube-to-tube variability or furnace balance. This is done in addition to the traditional control methods which adjust the overall flow of fuel (or other stream) to control temperature.

Regulating temperatures in a furnace having process tubes and a plurality of burners for heating the process tubes can also present several challenges. The complex interaction of flame heating from the plurality of burners coupled with the uncertainty of temperature measurements has heretofore limited efficiency gains. Considering the temperature information across the full length of the process tubes adds further complexity.

One way to improve the efficiency of a reformer furnace is to maintain a uniformity of temperature among the process tubes at various elevations in the furnace. Thus, the measuring or monitoring of the temperature of each of the process tubes at one or more predetermined locations or elevations can be needed to obtain the desired efficiency improvement. In addition, the process tubes of a furnace can be under very high internal pressures (up to about 50 atmospheres) and at very high temperatures (up to about 950° C.). Thus, a slight change in temperature can reduce the operational life of a reactor tube. For example, operating at about 10° C. above the design temperature for the tube can reduce the operational life of the tube by as much as one half. The cost of repairing and/or replacing the tubes can be high due to the use of special alloys in the tubes that are needed to permit the tubes to survive the operational conditions of the furnace. As such, furnace operators also measure/monitor the tube temperatures to avoid exceeding the tube design temperature in addition to trying to obtain efficiency improvements. Effective temperature monitoring is helpful to ensure that tubes are working under the temperature design limit and therefore increases reliability of the furnace.

Industry desires to operate furnaces containing process tubes without exceeding design temperature limits for the process tubes at all elevations in the furnace.

Industry desires to operate furnaces containing process tubes with a uniformity of temperature among the process tubes at all elevations in the furnace.

Furnace efficiency also depends on the amount of excess oxidant (air) used to combust the fuel in the furnace. Excess oxidant is provided to ensure complete combustion of the fuel. The furnace efficiency is reduced when too much excess oxidant is provided.

Industry desires improved furnace efficiency through reduction of the excess oxidant requirement.

BRIEF SUMMARY

The present disclosure relates to a method of operating a furnace having a plurality of burners, each of the plurality of burners having flow rates associated therewith, the furnace containing a plurality of process tubes.

The method comprises:
 (a) selecting target temperature criterion pertaining to the plurality of process tubes, wherein the target temperature criterion comprises a first objective function where the first objective function comprises calculated probabilities that temperatures pertaining to the plurality of process tubes exceed respective limit temperatures;
 (b) measuring first temperature information comprising data for each of the plurality of process tubes at a first operating condition;
 (c) providing an estimate of a mathematical function characterizing a relationship between burner flow rate changes for two or more of the plurality of burners and individual temperature changes for at least a portion of the plurality of process tubes;

(d) calculating a first target flow rate solution set having solutions for the two or more of the plurality of burners consistent with conforming temperatures of the plurality of process tubes to the target temperature criterion for the plurality of process tubes using the estimate of the mathematical function and the first temperature information for the plurality of process tubes; and (e) adjusting a first valve upstream of at least one of the two or more of the plurality of burners to change at least one of the flow rates of the two or more of the plurality of burners in accordance with the first target flow rate solution set wherein the first valve is not upstream of all burners of the furnace.

The estimate of the mathematical function may be represented as $$\Delta \underline{T} = \underline{G} \Delta \underline{u}$$

where $\Delta \underline{T}$ represents the individual temperature changes for the at least a portion of the plurality of process tubes; $\Delta \underline{u}$ represents burner flow rate changes for the two or more of the plurality of burners and $\underline{G}$ is a gain matrix.

The mathematical function characterizes a relationship between the changes in tube wall temperature and the changes in the valve position controlling the flow of fuel to an individual burner I. $\underline{G}$ may be a matrix with $N_{burner}$ columns and $N_{tube} \times N_{segment}$ rows, where $N_{tube}$ is the number of tubes in the furnace and $N_{segment}$ is the number of segments per tube.

The matrix elements $g_{(j,k),I}$ may be computed using the formula $$g_{(j,k),I} = \begin{cases} \alpha_1 * \left( \exp\left( \alpha_2 * \sqrt{x_{I,j}^2 + y_{I,j}^2} \right) + \alpha_3 \right) & 0 \leq z_{j,k} \leq z_f \\ \alpha_1 * \left( \frac{z}{z_f} \right)^{\alpha_4} * \left( \exp\left( \alpha_2 * \sqrt{x_{I,j}^2 + y_{I,j}^2} \right) + \alpha_3 \right) & z_{j,k} > z_f \end{cases}$$

where the functional elements $g_{(j,k),I}$ are the gains for a change in valve position (measured in ° C./percent valve opening) associated with fuel stream in burner I and segment k of reactor tube j. $z_{j,k}$ is the height of the tube segment k for tube j from the top of the tube, and $z_f$ is the length of the flame. Parameters $\alpha_1$, $\alpha_2$, $\alpha_3$, and $\alpha_4$ correlate the relationship between the burner flow rates and the reactor tube temperatures.

In the method, the first temperature information for the plurality of process tubes may be measured by:
  capturing a first plurality of images of an interior area of the reformer furnace, at least some images of the first plurality of images being associated with different portions of the interior area of the reformer furnace, wherein each image of the first plurality of images comprises first pixel data associated with a respective portion of the plurality of process tubes; and
  processing a portion of the first pixel data to obtain the first temperature information for the plurality of process tubes.

The calculated probabilities that temperatures pertaining to the plurality of process tubes exceed respective limit temperatures may be determined from the first temperature information.

The calculated probabilities that temperatures pertaining to the plurality of process tubes exceed respective limit temperatures may be determined from weighted average values (e.g. mean, median, and/or mode) and variances calculated from the first temperature information.

The target temperature criterion may comprise a plurality of objective functions. The plurality of objective functions may include the first objective function comprising calculated probabilities that temperatures for the plurality of process tubes exceed respective limit temperatures and a second objective function not including a calculated probability.

The limit temperatures may be related to selected process tube design temperature limits.

The first objective function may comprise calculated probabilities that temperatures pertaining to the plurality of process tubes exceed respective limit temperatures for tube segments at a selected furnace elevation.

The first objective function may characterize the average mean probability of exceeding the limit temperatures for tube segments at a selected height or length of the process tubes in the furnace.

The first objective function may characterize the average mean probability that the process tubes exceed the limit temperatures for multiple segmented lengths of the process tubes.

The first objective function may characterize the maximum probability that the process tubes exceed the limit temperature for the process tubes.

The first objective function may comprise calculated probabilities that temperatures pertaining to the plurality of process tubes exceed respective limit temperatures of a corresponding plurality of gas-transfer outlet tubes (i.e. outlet pigtail tubes) connecting each respective tube of the plurality of process tubes to a header.

The first objective function may characterize the average mean probability of exceeding the limit temperatures for the gas-transfer outlet tubes.

The first objective function may characterize the maximum probability that the gas-transfer outlet tubes exceed the limit temperature for the gas-transfer outlet tubes.

The method may further comprise:
  measuring second temperature information for the plurality of process tubes at a second operating condition different from the first operating condition; and
  wherein the estimate of the mathematical function provided in step (c) is calculated using the first temperature information and the second temperature information.

The second temperature information for the plurality of process tubes may be measured by:
  capturing a second plurality of images of the interior area of the reformer furnace, at least some images of the second plurality of images being associated with different portions of the interior area of the reformer furnace, wherein each image of the second plurality of images comprises second pixel data associated with a respective portion of the plurality of process tubes; and
  processing a portion of the second pixel data to obtain the second temperature information for the plurality of process tubes.

The first temperature information may include uncertainty values and the second temperature information may include uncertainty values; and the estimate of the mathematical function and/or the updated estimate of the mathematical function may be calculated using the uncertainty values of the first temperature information and the uncertainty values of the second temperature information.

The method may further comprise:
  measuring second temperature information for the plurality of process tubes at a second operating condition different from the first operating condition and subsequent to the first operating condition;

calculating a second target flow rate solution set having solutions for the two or more of the plurality of burners consistent with conforming temperatures of the plurality of process tubes to the target temperature criterion using the estimate or an updated estimate of the mathematical function and using the second temperature information for the plurality of process tubes; and adjusting the first valve or a second valve upstream of at least one of the two or more of the plurality of burners to change at least one of the flow rates of the two or more of the plurality of burners in accordance with the second target flow rate solution set wherein the second valve is not upstream of all burners of the reformer furnace.

The second operating condition may result from conducting step (e).

The method may further comprise:

updating the estimate of the mathematical function from the second temperature information for the plurality of process tubes thereby forming the updated estimate of the mathematical function; and the step of calculating the second target flow rate solution set may then use the updated estimate of the mathematical function.

The estimate of the mathematical function may comprise calculated values from functional elements wherein each of the functional elements comprise a functional form comprising a first functional parameter, a second functional parameter and a geometric parameter characterizing distances between each of the plurality of process tubes and each of the plurality of burners;

wherein the first functional parameter of a first functional element of the functional elements has the same value as the first functional parameter of a second functional element of the functional elements; and wherein the second functional parameter of a first functional element of the functional elements has the same value as the second functional parameter of a second functional element of the functional elements.

The first functional parameter may have a value that is the same for each of the functional elements and the second functional parameter may have a value that is the same for each of the functional elements.

The plurality of burners may comprise two or more rows of burners and the first valve may be upstream of a first row of burners. The method may then further comprise:

measuring second temperature information for the plurality of process tubes at a second operating condition different from the first operating condition and subsequent to the first operating condition;

calculating a second target flow rate solution set having solutions for the two or more of the plurality of burners consistent with conforming temperatures of the plurality of process tubes to the target temperature criterion using the estimate or an updated estimate of the mathematical function and using the second temperature information for the plurality of process tubes; and adjusting a second valve upstream of a single burner of the two or more of the plurality of burners to change at least one of the flow rates of the single burner in accordance with the second target flow rate solution set wherein the second valve is not upstream of any burner other than the single burner.

The first valve may be upstream of a lone first burner of the two or more of the plurality of burners. The method may then further comprise:

measuring second temperature information for the plurality of process tubes at a second operating condition wherein the second operating condition results from step (e);

adjusting a second valve in accordance with the first target flow rate solution set wherein the second valve is upstream of a lone second burner of the two or more of the plurality of burners;

measuring third temperature information for the plurality of process tubes at a third operating condition wherein the third operating condition results from adjusting the second valve in accordance with the first target flow rate solution set;

updating the estimate of the mathematical function from the second temperature information and the third temperature information thereby forming the updated estimate of the mathematical function;

calculating a second target flow rate solution set having solutions for the two or more of the plurality of burners consistent with conforming temperatures of the plurality of process tubes to the target temperature criterion using the updated estimate of the mathematical function; and adjusting at least one of the first valve, the second valve or a third valve upstream of the two or more of the plurality of burners to change at least one of the flow rates of the of the two or more of the plurality of burner in accordance with the second target flow rate solution set wherein the third valve is not upstream of all burners in the reformer furnace.

The furnace has an exhaust for withdrawing a combustion product gas stream and may comprise a plurality of oxygen concentration sensors operatively disposed to sense the oxygen concentration in the combustion product gas stream, the plurality of oxygen concentration sensors spatially positioned to detect oxygen concentration changes responsive to changes in the flow rates of individual burners or groups of burners, The method may further comprise:

(a') selecting target oxygen concentration criterion pertaining to the plurality of oxygen concentration sensors;

(b') measuring first oxygen concentration information comprising data for each of the plurality of oxygen concentration sensors at the first operating condition;

(c') providing an estimate of a second mathematical function characterizing a relationship between burner flow rate changes for two or more of the plurality of burners and individual oxygen concentration changes for the plurality of oxygen concentration sensors; and (d') calculating a first excess oxygen-related target flow rate solution set having solutions for the two or more of the plurality of burners consistent with conforming oxygen concentrations measured by the plurality of oxygen concentration sensors to the target oxygen concentration criterion for the plurality of oxygen concentration sensors using the estimate of the second mathematical function and the first oxygen concentration information;

(e') wherein the first valve upstream of at least one of the two or more of the plurality of burners is adjusted to change at least one of the flow rates of the two or more of the plurality of burners in accordance with the first target flow rate solution set and the first excess oxygen-related target flow rate solution set.

The first valve may be adjusted in accordance with the first target flow rate solution set and the first excess oxygen-related target flow rate solution set using a weighting function for the first target flow rate solution set and the first excess oxygen-related target flow rate solution set.

The estimate of the second mathematical function may be represented as $$\Delta \underline{C_{O_2}} = \underline{G'} \Delta \underline{u}$$

where $$\Delta \underline{C_{O_2}}$$

represents the individual excess oxygen changes for the at least a portion of the plurality of oxygen sensors, $\Delta \underline{u}$ represents burner flow rate changes for the two or more of the plurality of burners and $\underline{G}'$ is a second gain matrix.

The method may further comprise:
measuring second oxygen concentration information comprising data for each of the plurality of oxygen concentration sensors at the second operating condition or a third operating condition different from the first operating condition; and
wherein the estimate of the second mathematical function provided in step (c') is calculated using the first oxygen concentration information and the second oxygen concentration information.

The method may further comprise:
measuring second oxygen concentration information comprising data for each of the plurality of oxygen centration sensors at the second operating condition or a third operating condition different from the first operating condition and wherein the second operating condition or third operating condition are subsequent to the first operating condition;
calculating a second excess oxygen-related target low rate solution set having solutions for the two or more of the plurality of burners consistent with conforming oxygen concentrations measured by the plurality of oxygen concentration sensors to the target oxygen concentration criterion from the plurality of oxygen concentration sensors using the estimate or an updated estimate of the second mathematical function and using the second oxygen concentration information; and
adjusting the first valve or a second valve upstream of at least one of the two or more of the plurality of burners to change at least one of the flow rates of the two or more of the plurality of burners in accordance with the second excess oxygen-related target flow rate solution set wherein the second valve is not upstream of all burners of the reformer furnace.

The second operating condition or third operating condition may result from conducting step (e').

The method may further comprise:
updating the estimate of the second mathematical function from the second oxygen concentration information thereby forming the updated estimate of the second mathematical function; and
the step of calculating the second excess oxygen-related target flow rate solution set may then use the updated estimate of the second mathematical function.

The present disclosure also relates to a second method of operating a furnace having a plurality of burners, each of the plurality of burners having flow rates associated therewith, the furnace containing a plurality of process tubes and having an exhaust for withdrawing a combustion product gas stream, the furnace comprising a plurality of oxygen concentration sensors operatively disposed to sense the oxygen concentration in the combustion product gas stream and spatially positioned to detect oxygen concentration responsive to changes in the flow rates of individual burners or groups of burners.

The second method comprises:
(i) selecting target oxygen concentration criterion for the plurality of oxygen concentration sensors;
(ii) measuring first oxygen concentration information comprising data for each of the plurality of oxygen concentration sensors at a first operating condition;
(iii) providing an estimate of a mathematical function characterizing a relationship between burner flow rate changes for two or more of the plurality of burners and individual oxygen concentration changes for the plurality of oxygen concentration sensors;
(iv) calculating a first excess oxygen-related target flow rate solution set having solutions for the two or more of the plurality of burners consistent with conforming oxygen concentrations measured by the plurality of oxygen concentration sensors to the target oxygen concentration criterion for the plurality of oxygen concentration sensors using the estimate of the mathematical function and the first oxygen concentration information; and
(v) adjusting a first valve upstream of at least one of the two or more of the plurality of burners to change at least one of the flow rates of the two or more of the plurality of burners in accordance with the first excess oxygen-related target flow rate solution set wherein the first valve is not upstream of all burners of the furnace.

The estimate of the second mathematical function may be represented as $$\Delta C_{O_2,j} = \beta \sum_i \alpha_{i,j} \Delta u_i$$

where $\Delta C_{O_2,j}$ represents the change in oxygen concentration at sensor j, $\Delta u_i$ represents the sum of burner flow rate in burner row i and $\beta$ and $\alpha_{i,j}$ are parameters which have been identified experimentally.

The second method may further comprise:
measuring second oxygen concentration information comprising data for each of the plurality of oxygen concentration sensors at the second operating condition different from the first operating condition; and
wherein the estimate of the second mathematical function provided in step (iii) is calculated using the first oxygen concentration information and the second oxygen concentration information.

The second method may further comprise:
measuring second oxygen concentration information comprising data for each of the plurality of oxygen centration sensors at the second operating condition different from the first operating condition and wherein the second operating condition is subsequent to the first operating condition;
calculating a second excess oxygen-related target flow rate solution set having solutions for the two or more of the plurality of burners consistent with conforming oxygen concentrations measured by the plurality of oxygen concentration sensors to the target oxygen concentration criterion from the plurality of oxygen concentration sensors using the estimate or an updated estimate of the second mathematical function and using the second oxygen concentration information; and adjusting the first valve or a second valve upstream of at least one of the two or more of the plurality of burners to change at least one of the flow rates of the two or more of the plurality of burners in accordance with the second excess oxygen-related target flow rate solution set wherein the second valve is not upstream of all burners of the reformer furnace.

The second operating condition may result from conducting step (iv).

The method may further comprise:

updating the estimate of the second mathematical function from the second oxygen concentration information thereby forming the updated estimate of the second mathematical function; and the step of calculating the second excess oxygen-related target flow rate solution set may then use the updated estimate of the second mathematical function.

BRIEF DESCRIPTION OF SEVERAL VIEWS OF THE DRAWINGS

Wherever possible, the same reference numbers will be used throughout the drawings to represent the same parts.

DETAILED DESCRIPTION OF THE PREFERRED EMBODIMENTS

The present method will be described more fully hereinafter with reference to the accompanying drawings, in which an exemplary embodiment of the disclosure is shown. This disclosure may, however, be embodied in many different forms and should not be construed as limited to the embodiments set forth herein.

The articles "a" and "an" as used herein mean one or more when applied to any, feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

As used herein, "plurality" means "at least two."

The present invention relates to a method of operating a furnace where the furnace has a plurality of burners and contains a plurality of process tubes. The furnace may have at least 10 burners, typically between 20 and 500 burners. The burners are typically arranged in rows. The furnace may contain at least 20 process tubes, typically between 40 and 1000 process tubes. The process tubes are typically arranged in rows. Temperatures in the furnace, notably reactor tube temperatures are regulated by adjusting fuel and/or oxidant flow rates through the burners.

The present method provides a systematic and quantitative approach to determine how to adjust burner flow rates to result in desired tube wall temperatures. Objective functions for the tube wall temperatures are provided where it is desired to minimize the temperature differences between the tubes and/or the probability of exceeding limit temperatures across multiple elevations in the furnace.

The present method also optionally provides a systematic and quantitative approach to determine how to adjust burner flow rates to result in desired excess oxygen concentrations for the combustion products gases discharged from the exhaust of the furnace.

Figure 1:
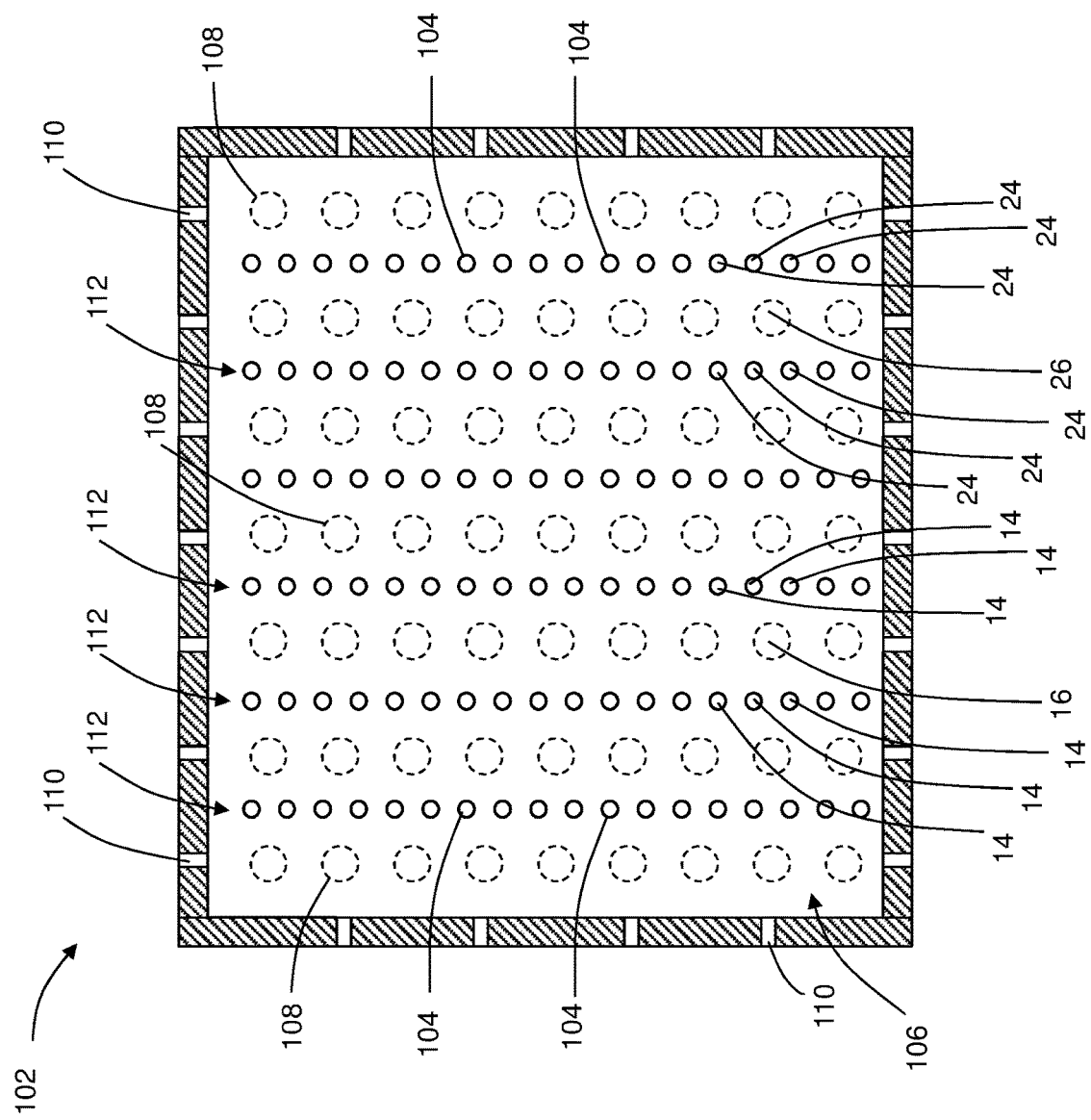
FIG. 1 shows a cross-sectional view of a furnace.

FIG. 1 shows a cross-sectional representation of a furnace 102 with a plurality of process tubes 104 positioned within an interior area 106 of furnace 102. Furnace 102 may be a steam methane reformer, methanol reformer, ethylene cracker, platformer reheat furnace, radiant heat chamber, or other similar type of furnace, reformer or chamber. The process tubes may contain a catalyst, for example, reforming catalyst. The catalyst may be in any form known in the art, for example, pellets and structured packing. Process tubes 104 can be positioned in a plurality of rows 112 separated by burners 108. Process tubes 104 can extend either vertically or horizontally in furnace 102. A plurality of burners 108 may be arranged in rows and used to raise the temperature of the interior area 106 of the furnace 102 to a desired temperature to accomplish the process or activity to be performed inside the furnace 102. The rows of tubes 104 and rows of burners 108 may be substantially parallel. Along the perimeter of furnace 102 are view ports 110 that permit tubes 104, burners 108 and any other structure or feature inside furnace 102 to be viewed and/or analyzed from a point exterior to the furnace 102. Pairs of view ports 110 may be positioned on the perimeter of the furnace 102 at opposite ends of a row of burners 108.

Oxidant gas flow rates and fuel flow rates are associated with each of the plurality of burners. Any known fuel or combination of fuels may be used, for example, natural gas or a by-product stream containing methane and carbon monoxide from a pressure swing adsorber used to separate hydrogen from a reformer effluent. Oxidant gases include air, industrial grade oxygen, oxygen-enriched air, and oxygen-depleted air such as gas turbine exhaust.

This method comprises selecting target temperature criterion (sometimes referred in the art as an optimization target) for the plurality of process tubes. This means that it is necessary to specify (mathematically) what constitutes the most preferred temperatures for the plurality of process tubes. This target applies to the variability from tube-to-tube (the furnace balance) not along the tube length or around the tube diameter. The most preferred temperatures are an idealization that cannot be realized exactly. So the target temperature criterion is a mathematical statement of which of the practical temperature variations are most preferred. The plurality of process tubes considered in the method need not include all of the process tubes in the furnace.

It may be preferred that there is no variability among the tube temperatures at multiple (all) elevations in the furnace and the probability that temperatures exceed limit temperatures is zero. This is equivalent to saying that the measured temperature of each tube is equal to the average temperature of all the tubes at all elevations and the temperatures are all less than limit temperature (i.e. design temperature limits). Traditional furnace control allows the average temperature to be adjusted up or down to match a fixed temperature target and this traditional control may be overlaid on top of the furnace balancing, but is not the basis for the target temperature criterion.

The target temperature criterion is formulated based on a measure of variability. Many measures of variability are in common usage including the variance and standard deviation, and other measures of variability may be used (e.g., the maximum measured value minus the average measured value). Combinations may be constructed which include these different measures (e.g., a weighting factor times the variance plus another weighting factor times the difference between the maximum measured temperature and the average).

In the present method, the target temperature criterion pertaining to the plurality of process tubes are selected where the target temperature criterion comprise one or more objective functions. At least one (i.e. a first objective function) of the one or more objective functions comprises probabilities that temperatures pertaining to the plurality of process tubes exceed respective temperature limits. The target temperature criterion may pertain to various tube segments, and/or gas-transfer outlet tubing connecting the process tubes to a header (i.e. outlet pigtail tubes). The first objective function may comprise at least one of a sum, maximum and/or a weighted average value (e.g. mean, median and/or mode) of calculated probabilities that temperatures for the plurality of process tubes exceed respective limit temperatures.

Various objective functions can be defined that comprise probabilities that temperatures exceed respective limit temperatures.

For example, an objective function may characterize the average probability of exceeding the tube design temperature limit at a height corresponding to the height of the lower viewports in the furnace. This objective function, $F_1$, may be expressed mathematically as:

$$F_1 = \frac{\sum_{j=1}^{N_{tube}} p_{j,LVP}}{N_{tube}}$$

where $p_{j,LVP}$ is the probability that the temperature $T_{j,LVP}$ of a process tube j for a tube segment at the height of a lower view port (LVP) is greater than the limit temperature. The process tubes may be conveniently indexed with the index j, where the tubes are numbered from 1 to $N_{tube}$, where $N_{tube}$ is the total number of process tubes in the furnace.

For each tube at the height of the lower viewport, the probability of the temperature exceeding the limit temperature is first calculated and an average across the tubes is derived. The probability provides a value that associates one fixed value (or a threshold) with one normal distribution for which the parameters (mean and standard deviation are derived from a limited number of measurements.

Probability factors are calculated for each tube segment. The temperatures for tube segments are measure using pixel data from one or more camera images, and segmenting the image pixels to the corresponding heights. For example, it may be desired to estimate temperatures for segments with a length of 0.25 m (0.82 ft). For each process tube segment, the associated uncertainty of the temperature estimate is used to calculate the probability that the temperature estimate of the process tube segment is higher than a limit temperature.

The probability $p_{i,j,LVP}$ may be determined from:

$$p_{j,LVP} = 1 - \Phi(Z_{j,LVP}) = \Phi(-Z_{j,LVP})$$

where $$Z_{j,LVP} = \frac{T_{tube\_limit} - \overline{T_{j,LVP}^w}}{\sigma_{j,LVP}},$$

$$\overline{T_{j,LVP}^w} = \frac{\sum_{i=1}^{n} s_i T_{i,j,LVP}}{\sum_{i=1}^{n} s_i}, \text{ and}$$

$$\sigma_{j,LVP}^2 = \frac{\sum_{i=1}^{n} s_i (T_{i,j,LVP} - \overline{T_{j,LVP}^w})^2}{\sum_{i=1}^{n} s_i}$$

where $T_{i,j,LVP}$ is the temperature measurement for the ith measure for the jth tube at the height of the lower viewport, where i is the index representing the different temperature measurements (e.g. from each of the temperature measurement devices) and ranges from 1 to n, where n is the total number of temperature measurements, where $\overline{T_{i,j,LVP}}^w$ and $\sigma_{j,LVP}$ are the weighted average and standard deviation, respectively, of the temperature measure, for the jth tube at the height of the lower view port, where $Z_{i,j,LVP}$ is the Z score of $T_{tube\_limit}$ for a normal distribution of $N(T_{j,LVP}^w, \sigma_{j,LVP})$, and where $s_i$ is the number of pixels within the corresponding image grids (or the sizes of the image grids).

The value of the function $\Phi$ can be looked up in a Z score table.

For any tube segment, the temperature estimation is based on information from its corresponding image grid in the captured digital images. The pixel data within that grid are utilized to derive the temperature through a temperature model. Since each tube segment is present in more than one of the images, there are multiple temperature measurements for each tube segment. For n temperature measurements, $T_1$, $T_2$, $T_3$, ... $T_n$ for one tube segment, the numbers of pixels within the corresponding image grids (or the sizes of the image grids) are $s_1$, $s_2$, $s_3$, ... $s_n$.

The availability of multiple temperature measurements makes it possible to characterize the uncertainty of the temperature information.

Temperature estimations from larger image grids are generally more reliable. Then a weighted average for the temperature measure can be expressed as:

$$\overline{T_w} = \frac{\sum_{i=1}^{n} s_i T_i}{\sum_{i=1}^{n} s_i}$$

where i is the index representing different temperature measurements and n is the total number of measurements, $\overline{T_w}$ is the weighted average temperature measure. A larger weight is given to a larger image grid.

The biased weighted variance may be expressed as:

$$\sigma^2 = \frac{\sum_{i=1}^{n} s_i (T_i - \overline{T_w})^2}{\sum_{i=1}^{n} s_i}.$$

The uncertainty of the temperature measurement could be characterized by σ, which is the square root of the variance, $\sigma^2$.

Obtaining weighted mean values and weighted measures of uncertainty are routine and well-known in the literature.

Once the weighted average temperature measure (mean temperature), $\overline{T_w}$, and the standard deviation, σ, are determined, an assumption about the temperature distribution can be made. For example, it could be assumed that the temperature follows a normal Gaussian distribution.

Figure 2:
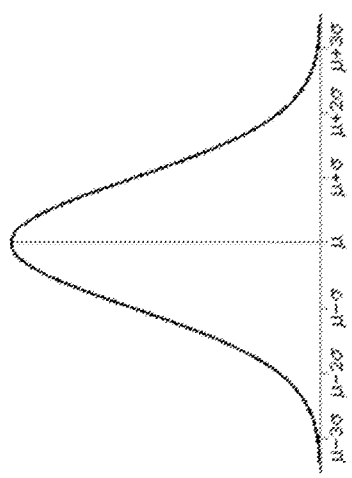
FIG. 2 is a plot of a probability distribution function.

FIG. 2 is a plot of a normal distribution. μ in the plot corresponds to $\overline{T_w}$ in the above discussion, and σ in the plot corresponds to σ in the above discussion.

Figure 3:
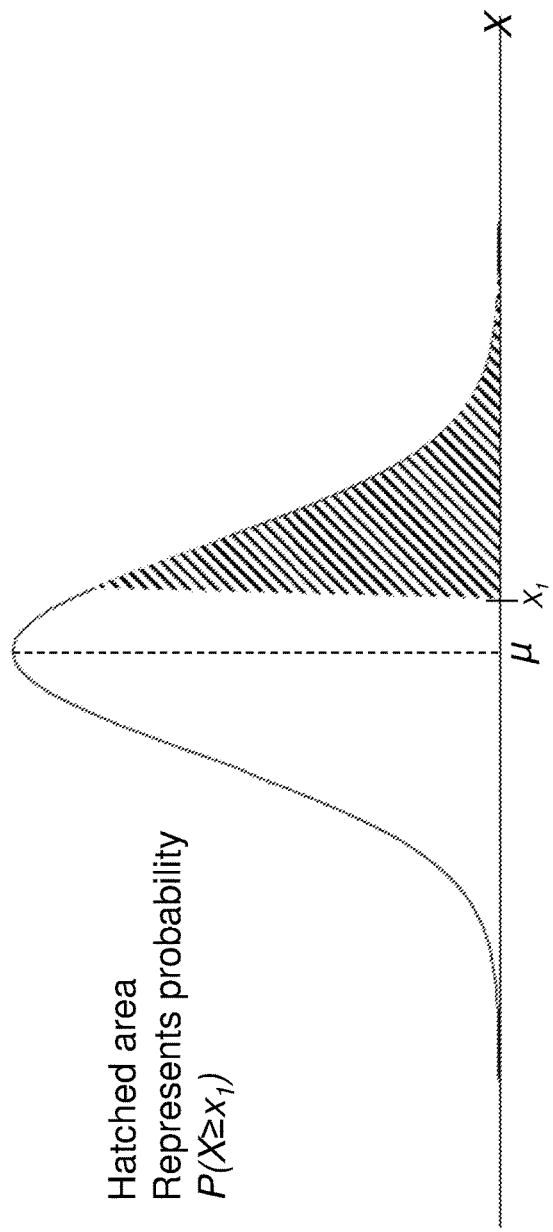
FIG. 3 is a plot of a probability distribution function showing probability that temperature exceeds limit temperature.

The calculation of probability is based on the assumption of the distribution for the temperature information. For example, the probability of exceeding the limit temperature is illustrated in FIG. 3. The limit temperature is denoted $X_1$ and the weighted average temperature (mean temperature) $\overline{T_w}$ is denoted μ in the plot. The shaded area under the curve and to the right of the limit temperature $X_1$ represents the probability that the temperature exceeds the limit temperature. The probability is the fraction of the shaded area divided by the total area under the bell curve.

In practice, the probability is calculated by deriving a Z score and looking up the probability from a Z score table.

Other objective functions may be similarly defined.

An objective function may be defined to characterize the average probability of exceeding the tube design temperature limit at the bottom of the process tubes. This objective function, $F_2$, may be expressed mathematically as:

$$F_2 = \frac{\sum_{j=1}^{N_{tube}} p_{j,BOT}}{N_{tube}}$$

where $p_{j,BOT}$ is the probability that the temperature $T_{j,BOT}$ of a process tube j for a tube segment at the bottom of the process tube (BOT) is greater than the limit temperature.

The probabilities $p_{j,BOT}$ may be determined as described above for the probabilities at the lower view port with the appropriate changes made for the difference in location of the temperature measurements.

Objective functions similar to $F_1$ and $F_2$ can be defined for any desired height of the process tubes.

An objective function may be defined where the height of each process tube is divided in to multiple segments, for example K segments, where K is the total number of divisions, where the objective function is defined to characterize the average probability that the process tubes exceed the limit temperature (i.e. a tube design temperature limit) for the K segments of the process tubes. This objective function, $F_3$, may be expressed mathematically as:

$$F_3 = \frac{\sum_{j=1}^{N_{tube}} \sum_{k=1}^{K} p_{j,k}}{N_{tube} \times K}$$

where $p_{j,k}$ is the probability that the temperature $T_{j,k}$ of a process tube j for a tube segment at segment k is greater than the limit temperature.

The probabilities $p_{j,k}$ may be determined as described above for the probabilities at the lower view port with the appropriate changes made for the difference in location of the temperature measurements. This objective function, $F_3$, quantifies the sum of non-uniformities of the distribution of temperatures across all levels.

The process tubes may be divided into 10 segments, for example, where K=10.

An objective function may be defined where the height of each process tube is divided in to multiple segments, for example K segments, where K is the total number of divisions, where the objective function is defined to characterize the maximum probability, that the process tubes exceed the limit temperature (i.e. a tube design temperature limit) for the K segments of the process tubes. This objective function, $F_4$, may be expressed mathematically as:

$$F_4 = \max_{j,k}(p_{j,k})$$

where $p_{j,k}$ is the probability that the temperature $T_{j,k}$ of a process tube j for a tube segment at segment k is greater than the limit temperature.

The probabilities $p_{j,k}$ may be determined as described above for the probabilities at the lower view port with the appropriate changes made for the difference in location of the temperature measurements.

An objective function may be defined to characterize the average probability of exceeding the gas-transfer outlet tube design limit temperature for the plurality of gas-transfer outlet tubes (i.e. outlet pigtail tubes) connecting each respective tube of the plurality of tubes at the bottom of the process tubes to a header. This objective function, $F_5$, may be expressed mathematically as:

$$F_5 = \frac{\sum_{j=1}^{N_{tube}} p_{j,pigtail}}{N_{tube}}$$

where $p_{j,pigtail}$ is the probability that the temperature, $T_{j,pigtail}$, for a gas-transfer outlet tube of a process tube j is greater than the limit temperature for the gas-transfer outlet tube. While the temperatures of the gas-transfer outlet tubes may not be measured directly, they can be estimated from the temperature measurements of the process tubes. The temperatures of the gas-transfer outlet tubes may be estimated from the tube segments at the lower viewport and/or tube segments below the lower viewport and/or tube segments 1 to 2 meters from the bottom of the process tubes and/or tube segment at the bottom of the process tube.

The probabilities $p_{j,pigtail}$ may be determined as described above for the probabilities at the lower view port with the appropriate changes made for determining the temperature of the gas-transfer outlet tubes from the estimation from the temperature measurements of the process tubes.

An objective function may be defined to characterize the maximum probability that the gas-transfer outlet tubes exceed the gas-transfer outlet tube design limit temperature (i.e. a tube design temperature limit) for the gas-transfer outlet tubes. This objective function, $F_6$, may be expressed mathematically as:

$$F_6 = \max_{j,k}(p_{j,k,pigtail})$$

where $p_{j,pigtail}$ is the probability that the temperature, $T_{j,pigtail}$, for a gas-transfer outlet tube of a process tube j is greater than the limit temperature for the gas-transfer outlet tube. While the temperatures of the gas-transfer outlet tubes may not be measured directly, they can be estimated from the temperature measurements of the process tubes. The temperatures of the gas-transfer outlet tubes may be estimated from the tube segments at the lower viewport and/or tube segments below the lower viewport and/or tube segments 1 to 2 meters from the bottom of the process tubes and/or the tube segment at the bottom of the process tube.

The probabilities $p_{j,pigtail}$ may be determined as described above for the probabilities at the lower view port with the appropriate changes made for determining the temperature of the gas-transfer outlet tubes from the estimation from the temperature measurements of the process tubes.

The target temperature criterion may comprise a plurality of objective functions in a global objective function. The global objective function comprising the plurality of objective functions may be minimized/optimized, for example, as a weighted sum of the plurality of objective functions. The global objective function may be expressed:

$$F_{global} = \Sigma_{m=1}^{M} w_m F_m$$

where $w_m$ is the weight factor with values between 0 and 1, m is the index for the individual objective functions, and M is the total number of individual objective functions used.

The plurality of objective functions may include an objective function not including a calculated probability, in addition to including the objective function comprising calculated probabilities that temperatures pertaining to the plurality of process tubes exceed respective limit temperatures.

Various objective functions can be defined that do not include probabilities that temperatures exceed respective limit temperatures.

For example, an objective function may characterize the standard deviation of temperatures of process tube segments across all process tubes at a height corresponding to the height of the lower viewports in the furnace. This objective function, $F_7$, may be expressed mathematically as:

$$F_7 = \sqrt{\frac{\sum_{j=1}^{N_{tube}} (T_{j,LVP} - \overline{T}_{LVP})^2}{N_{tube} - 1}},$$

$$\text{where } \overline{T}_{LVP} = \frac{\sum_{j=1}^{N_{tube}} T_{j,LVP}}{N_{tube}},$$

where $T_{j,LVP}$ is the temperature for the jth tube for a tube segment at the height of the lower viewport, and $N_{tube}$ is the number of tubes in the furnace.

This objective function, $F_7$, quantifies the non-uniformity of the distribution of temperatures at the height of the lower viewports.

Other objective functions not including probabilities may be similarly defined.

An objective function may be defined to characterize the standard deviation of temperatures of process tube segments across all process tubes at the bottom of the process tubes. This objective function, $F_8$, may be expressed mathematically as:

$$F_8 = \sqrt{\frac{\sum_{j=1}^{N_{tube}} (T_{j,BOT} - \overline{T}_{BOT})^2}{N_{tube} - 1}},$$

$$\text{where } \overline{T}_{BOT} = \frac{\sum_{j=1}^{N_{tube}} T_{j,BOT}}{N_{tube}},$$

where $T_{j,BOT}$ is the temperature for the jth tube for a tube segment at the at the bottom of the process tube (BOT), and $N_{tube}$ is the number of tubes in the furnace.

Objective functions similar to $F_7$ and $F_8$ can be defined for any desired height of the process tubes.

An objective function may be defined where the height of each process tube is divided into multiple segments, for example K segments, where K is the total number of divisions, where the objective function is defined to characterize the sum of standard deviations of temperatures across all process tubes at each height/level for the K segments of the process tubes. This objective function, $F_9$, may be expressed mathematically as:

$$F_9 = \sum_k \sqrt{\frac{\sum_j (T_{j,k} - \overline{T}_k)^2}{N_{tube} - 1}},$$

$$\text{where } \overline{T}_k = \frac{\sum_{j=1}^{N_{tube}} T_{j,k}}{N_{tube}},$$

where $T_{j,k}$ is the temperature for tube j for a tube segment at segment k, and $N_{tube}$ is the number of tubes in the furnace. This objective function, $F_9$, quantifies the sum of non-uniformities of the distribution of temperatures across all levels.

An objective function may be defined where the height of each process tube is divided in to multiple segments, for example K segments, where K is the total number of divisions, where the objective function is defined to characterize the standard deviation of temperatures across all tubes and levels for the K. segments of the process tubes. This objective function, $F_{10}$, may be expressed mathematically as:

$$F_{10} = \sqrt{\frac{\sum_{j,k}(T_{j,k} - \overline{T})^2}{K \times N_{tube} - 1}},$$

where $$\overline{T} = \frac{\sum_{j,k} T_{j,k}}{K \times N_{tube}},$$

where $T_{j,k}$ is the temperature for tube j for a tube segment at segment k at the height of the kth segment of the K segments, and $N_{tube}$ is the number of tubes in the furnace. This objective function, $F_{10}$, quantifies the non-uniformity of the distribution of temperatures across all tubes and levels.

An objective function may be defined to characterize the difference between maximum and average (mean) values of temperatures across all tubes at the height of the lower viewport. This objective function, $F_{11}$, may be expressed mathematically as:

$$F_{11} = \max_j(T_{LVP}) - \overline{T}_{LVP},$$

where $$\overline{T}_{LVP} = \frac{\sum_{j=1}^{N_{tube}} T_{j,LVP}}{N_{tube}}$$

where $T_{j,LVP}$ is the temperature for the jth tube for a tube segment at the height of the lower viewport, and $N_{tube}$ is the number of tubes in the furnace. This objective function, $F_{11}$, quantifies the non-uniformity of the distribution of temperatures at the height of the lower viewport.

An objective function may be defined to characterize the difference between maximum and average (mean) values of temperatures across all tubes at the bottom of the process tubes. This objective function, $F_{12}$, may be expressed mathematically as:

$$F_{12} = \max_j(T_{BOT}) - \overline{T}_{BOT},$$

where $$\overline{T}_{BOT} = \frac{\sum_{j=1}^{N_{tube}} T_{j,BOT}}{N_{tube}}$$

where $T_{j,BOT}$ is the temperature for the jth tube for a tube segment at the bottom of the process tubes, and $N_{tube}$ is the number of tubes in the furnace. This objective function, $F_{12}$, quantifies the non-uniformity of the distribution of temperatures at the bottom of the process tubes.

An objective function may be defined where the height of each process tube is divided in to multiple segments, for example K segments, where K is the total number of divisions, where the objective function is defined to characterize the sum of differences between maximum and average (mean) values of temperatures across all tubes at each height level. This objective function, $F_{13}$, may be expressed mathematically as:

$$F_{13} = \sum_{k=1}^{K} \max_j(T_{j,k}) - \overline{T}_k,$$

where $$\overline{T}_k = \frac{\sum_{j=1}^{N_{tube}} T_{j,k}}{N_{tube}}$$

where $T_{j,k}$ is the temperature for tube j for a tube segment at segment k, and $N_{tube}$ is the number of tubes in the furnace. This objective function, $F_{13}$, quantifies the sum of non-uniformities of temperatures at all height levels of the process tubes in the furnace.

An objective function may be defined where the height of each process tube is divided in to multiple segments, for example K segments, where K is the total number of divisions, where the objective function is defined to characterize the difference between the maximum and average (mean) values of temperatures across all process tubes and at all height levels. This objective function, $F_{14}$, may be expressed mathematically as:

$$F_{14} = \max_{j,k}(T_{j,k}) - \overline{T},$$

where $$\overline{T} = \frac{\sum_{k=1}^{K} \sum_{j=1}^{N_{tube}} T_{j,k}}{N_{tube} \times K}$$

where $T_{j,k}$ is the temperature for tube j for a tube segment at segment k, and $N_{tube}$ is the number of tubes in the furnace. This objective function, $F_{14}$, quantifies the non-uniformity of the distribution of temperatures across all process tubes at all height levels in the furnace.

It may also be desirable to specify upper or lower bounds on tube temperatures. The optimization target may be specified to minimize the variance and a traditional controller set to raise or lower the average temperature to satisfy the bounding condition.

The method further comprises measuring first temperature information comprising data for each of the plurality of process tubes at a first operating condition. Operating conditions include oxidant flow rates, fuel flow rates, reactant gas feed rates, hydrogen production rate, furnace pressure, etc.

The calculated probabilities that temperatures pertaining to the plurality of process tubes exceed respective limit temperatures are determined from the first temperature information. The calculated probabilities that temperatures pertaining to the plurality of process tubes exceed respective limit temperatures may be determined from weighted average values (e.g. mean, median, and/or mode) and variances calculated from the first temperature information.

Furnace 102 may have view ports 110 at one or more levels or elevations. Having view ports 110 at more than one level permits greater view capability of the tubes 104.

The first temperature information of the plurality of process tubes may be measured by capturing a first plurality of images of an interior area of the reformer furnace, at least some images of the first plurality of images being associated with different portions of the interior area of the reformer furnace, wherein each image of the first plurality of images comprises first pixel data associated with a respective portion of the plurality of process tubes, and processing a portion of the first pixel data to obtain the first temperature information for the plurality of process tubes.

Temperature information may be obtained by taking a series of digital images of the tubes 104 in furnace 102 through view ports 110. The digital images may be taken by a digital camera or any other device capable of capturing digital image information. The digital images may be "still" digital images from a video camera (i.e. a still image from a continuous image device), or average digital images from a video camera (i.e. an image "averaged" over some time interval and not from just a "snapshot" at one time). The digital images may be obtained by pointing the digital camera through each view port 110 and then capturing the corresponding image information, i.e. "taking a picture" of the corresponding portion of the interior area.

The digital camera may be positioned on a monopod or other similar device to attempt to maintain desired pitch, yaw, and roll angles in the digital images and to assist in positioning the lens of the camera in the center of the view port 110. Further, the camera may be set to a manual mode for maintaining a more consistent aperture speed and the focus may be set to infinity.

Figure 4:
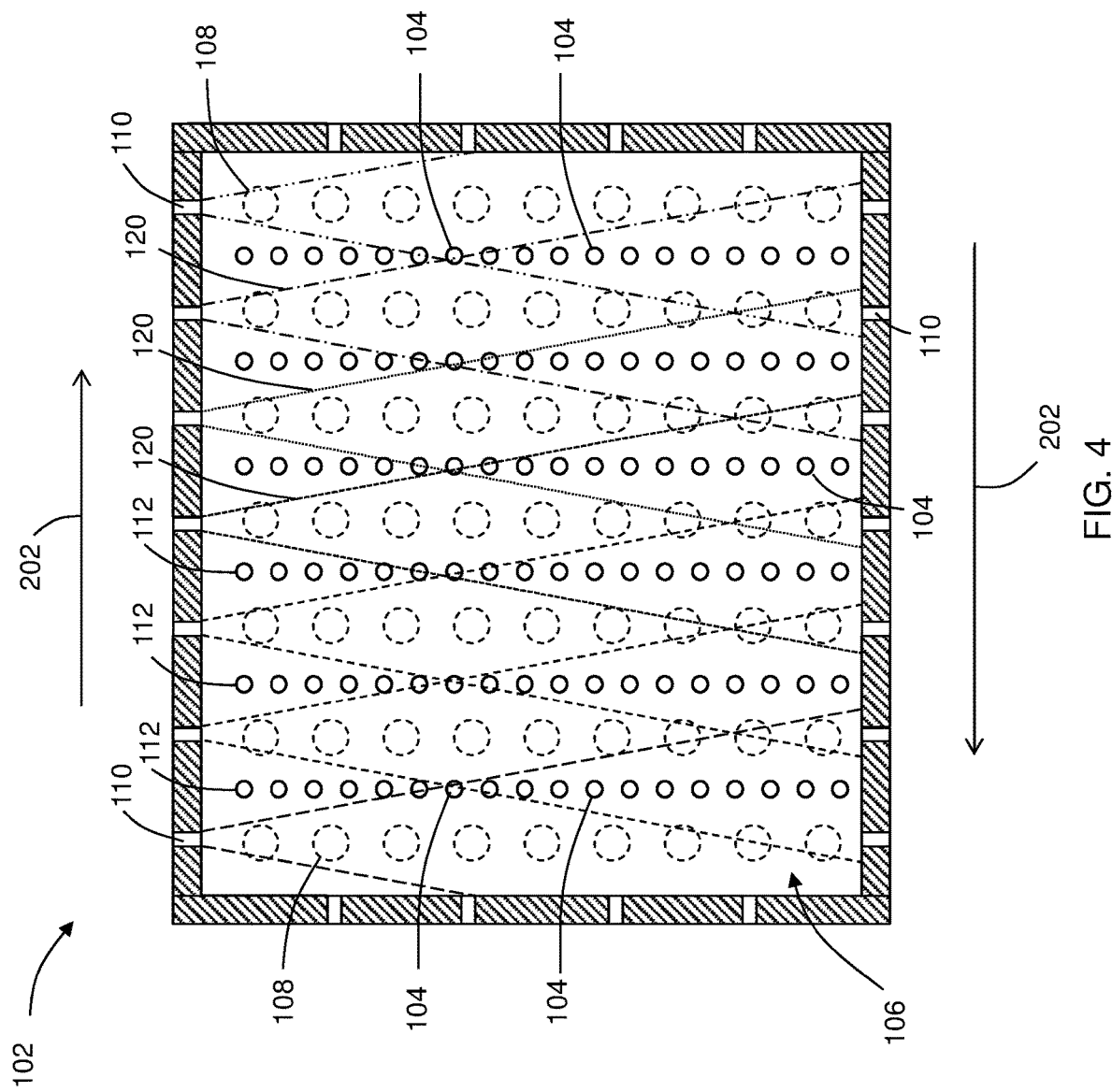
FIG. 4 shows a representation of the fields of view of a camera used to acquire image data from the furnace.

To obtain an image of the interior area 106 of the furnace 102, which includes the tubes 104, the camera may be briefly placed up to a view port 110 with the operator pointing the camera through the view port 110 and subsequently depressing the shutter button to capture the image and then removing the camera from view port 110, FIG. 4 shows the fields of view 120 of the camera when taking images from several view ports 110. As can be seen in FIG. 4, each field of view of the camera includes a portion of one or more rows of tubes 104. The period of time that the camera is pointing through the view port 110 should be minimized to protect the camera and operator from excessive radiant heat exposure; however, the camera should not be moving when the shutter button is being depressed to ensure that the image is not blurred. The procedure can be repeated for every view port 110 on the perimeter of furnace 102.

The camera may capture an image (or multiple images) through the view port of a portion of the interior area 106 of the furnace 102. The image may include a row of tubes 104 located along the left side of the image and another row of tubes 104 located along the right side of the image. In addition, the image may include an opposing view port. The opposing view port may be used to capture an image from the opposite wall of furnace 102. The image may include other structures and/or features of the interior area 106 of the furnace 102 that are within the field of view of the camera.

The portion of the interior area 106 captured in an image may overlap or include similar portions of the interior area 106 captured in other images. Stated differently, the portion of the interior area 106 shown in one image may include structures or features that are also shown in other images. For example, images taken from adjacent viewports 110 may show opposite sides of the same tube 104. Similarly, images taken from opposite viewports 110 may show the same tube 104 at different angles. Furthermore, the images are not required to correspond or map to specific or exclusive regions of the interior area 106 and may show substantially similar regions or portions of the interior area 106. An image shows a different portion of the interior area 106, if the image includes one structure or feature that is not shown in another image or shows the same structures or features at different angles or perspectives than the other images.

Images of the interior area 106 and tubes 104 from each view port 110 may be captured according to a predetermined sequence or along a predetermined path 202 around the perimeter of the furnace 102 as shown in FIG. 4. Predetermined path 202 can extend in either a clockwise or counter-clockwise direction. By capturing images in a predetermined sequence, the subsequent identification of the portion of interior area 106 captured in each image can be quickly accomplished since each step of the sequence or path corresponds to a known portion of interior area 106. Images of interior area 106 and tubes 104 may be taken in any desired order or sequence with the additional requirement that the corresponding portion of interior area 106 be correlated with the captured image. Since furnace 102 can include view ports 110 on opposite sides of furnace 102 and on each side of a row of tubes 104, all of the tubes 104 can be included in at least two images and many of the tubes 104 can be included in at least four images.

A single camera may be used to capture all of the images of the interior area 106 of the furnace 102. Utilizing the single camera to capture all of the images may increase the consistency of subsequent processing and analysis of the image data because the images are captured under uniform camera conditions such as uniform signal to noise levels and uniform sensitivities to different wavelengths. However, a plurality of cameras may be used to capture images, but subsequent processing and analysis of the image data should account for differences in the camera conditions such as differences in the sensitivities to different wavelengths and the differences in signal to noise ratios as a result of differences in conditions between cameras and/or models of cameras. The accounting for differences in camera conditions is needed to make image data acquired from one camera correspond with image data acquired from another camera.

When capturing an image of the interior area 106 of the furnace 102, the camera may include one or more filters to prevent or reduce certain wavelengths of light from reaching the imager or sensor. The image or sensor can include charge-coupled devices (CCDs) and/or complementary metal-oxide semiconductor (CMOS) devices. The filter may be designed to permit 30% of the light at a predetermined wavelength to pass through the filter and reach the sensor. The filter may be further designed to permit less light, i.e., less than 50% of the light, to pass through the filter at wavelengths that are less than the predetermined wavelength, and to permit more light, i.e., greater than 50% of the light, to pass through the filter at wavelengths that are greater than the predetermined wavelength. The predetermined wavelength may be about 715 nm or the predetermined wavelength may be between about 300 nm or less and/or 1000 nm or more.

The imager or sensor that is incorporated into the camera can include pixels that record the intensity of light received at the pixel. The number of pixels in the camera corresponds to the resolution of the camera. The camera may have a resolution between about 1 megapixel (approximately 1 million pixels) to about 10 megapixels (approximately 10 million pixels) or more. Each pixel in the imager or sensor may have one or more components or channels that record the intensity of light. Each pixel of the imager or sensor can have three components or channels, which may correspond to red (R), green (G) and blue (B) colors. The channels or components of the pixel can be configured to be more receptive to light at certain predetermined frequencies and less receptive to light at other predetermined frequencies when recording the intensity of light. In other words, light at certain predetermined frequencies can contribute more to the overall intensity measurement than light at other predetermined frequencies. When an image is captured, the recorded intensities for each channel or component of each pixel are stored as image data or pixel data. The pixels may be configured to measure the intensity of light in the visible spectrum.

After the images of the furnace 102 are obtained, the corresponding image data for each of the images may be loaded into a computer or other processing device for additional processing and analysis. Each of the images may then be processed using the computer to correct, i.e., reduce or eliminate any distortion in the image. Before each image can be processed to correct for distortion in the image, a transformation model to represent each lens and camera combination used to capture images may be constructed or created. To create a transformation model, a series of radial distortion models may be created for the lens and camera combination. A radial distortion model determines the amount of radial distortion that may be introduced by a calibrated lens and camera combination for a selected focal length (accounting for the possibility of a zoom lens) and selected focal distance. Once the transformation model has been created for a lens and camera combination, the transformation model can be applied to the images captured by that lens and camera combination to correct for any distortion. Methods for distortion correction are known in the art. Any suitable method for distortion correction may be used in connection with obtaining temperature information.

In addition to distortion correction, each of the images may be processed using the computer to correct for any rotation or deviation ("rotation correction") from a specific position, for example, a "centered position," Rotation correction can be performed to correct the vertical orientation of the image ("roll angle"), to correct the "up and down" angle ("pitch") and the "left and right" angle ("yaw"). The roll angle and pitch may be corrected by detecting the edge(s) of the last tube(s) 104 in the image and the position of the opposite view port 110 and then adjusting the image so the edge(s) of the last tube(s) 104 in the image are vertical. Yaw may be corrected using furnace geometry information. Methods for rotation correction are known in the art. Any suitable method for rotation correction may be used in connection with obtaining temperature information.

The "corrected" images may be processed using the computer to detect or determine the edges of the tubes 104 and/or any other desirable features, for example, opposing view port 110, in the image. The detected edges of the tubes 104 and the detected features from the image may be adjusted or modified in view of a geometric model of the furnace 102. A geometric model is a representation of the position in space of each feature in the furnace (typically represented by x, y, z coordinates and a reference point). Based on design specification such as the row spacing, tube-to-tube spacing and the distance between the wall and the first tube, an "as-built" geometric model can be developed. Due to manufacturing tolerances and tube movement resulting from thermal expansion, the tubes and other furnace features may not be located at precisely the same position as in the "as-built" geometric model. This model can be subsequently modified to match the actual operating conditions of the furnace by comparing the edges detected in the images to the geometric model. This allows the tubes or other features to be identified.

The geometrical model is used as the starting point to identify each tube. Edge detection is used to fine-tune the location of the feature, because tubes can bow or move in a high-temperature environment.

The edge of the tube banks and location of the view port are estimated based on a modeling scheme that incorporates both the geometrical information and the result of the edge detection from the image. The information of the edge detection from image processing is reconciled with the geometrical data.

The edge detection algorithm or process estimates the possible location of the edges and provides a probability distribution of where each edge may be located. The probability distribution of the location of the edge is compared with the geometrical model. Since there are multiple edges that are located at the same time, the error between the geometrical information and the probability density of the location of the edges are minimized to derive the final location of the edges.

Using the geometric model and the identified tube edges and other features, each tube 104 in each image may be identified and segmented. Starting with the detected edge of the last tube 104 in a row, a grid may be overlaid onto a portion of the image corresponding to the tube row. The grid may be unevenly spaced and may be based on dimensions and configuration from the geometric model such as the tube row spacing and tube center distance. The vertical lines of the overlaid grid correspond to the edges of tubes 104 based on known positions of tubes 104 from the geometric model. The spacing between the grid lines can vary from 1 pixel to 100 or more pixels depending on the resolution of the camera used. The grid may include a row of segments having a predetermined length and/or height. The segments may be centered on a predetermined elevation.

Each segment of the row of segments may then be checked to determine if the segment is part of a tube 104 or is another part of the interior area 106 as part of outlier or defect detection. If a segment is not part of a tube 104, the segment is discarded. The remaining segments, which correspond to tubes 104 in furnace 102, are then used in the analysis to determine a temperature of each of the tubes 104 in the corresponding image. The method used to determine outliers or whether a segment is part of a tube is based on a classification tree. The classification tree is developed using information from the geometric model. A series of different statistics are tested for a segment and based on the result of the tests, a segment is determined to be good (part of a tube) or bad (not a tube).

The temperature of the tubes 104 may be determined based on the pixel data from all of the images. To determine a temperature value for a tube 104 in an image, the pixel data in the segment of the corresponding tube 104 is processed to determine a value representing a measure of central tendency, which is then correlated to a temperature. The temperature or temperature value is a representative value for a tube. The tube temperature varies along its length and one or more selected elevations are measured to provide representative temperature value(s) for a tube. The processing of the pixel data, for example, intensity values, begins with obtaining a value representing a measure of central tendency, for each channel or component, from the pixel data of the pixels in the segment. The value representing a measure of central tendency may be a median of the pixel data. However, in other embodiments, the value representing a measure of central tendency may be a mean, robust mean, mode or other statistical measure derived from the pixel data. The value representing a measure of central tendency for each channel or component may then be correlated to a temperature value. The temperature value for a segment determined from the value representing a measure of central tendency may also be assigned an uncertainty value. The uncertainty value can quantify the confidence in the determined temperature value. Numerous factors such as the distance of the tube from the camera (path length, "d"), the camera angle (formed by a center line of the camera and the position of tube 104, "α"), the number of pixels in the segment representing the tube, can affect the confidence of a temperature value determination. If the pixel data includes multiple channels or components, the temperature value for each of the channels or components can be averaged using a statistical averaging technique, for example, average, weighted average, etc., to obtain a single temperature value for the segment, which corresponds to a tube 104.

To obtain a correlation between temperature values and the pixel data, a relationship between known temperatures and pixel data may be formed and stored in a database or other memory device for accessibility in the future. One technique to obtain the relationship between pixel data and temperature involves capturing an image of the interior area 106 and then soon thereafter following the image capture with the acquisition of temperature measurements of the tubes in the portion of the interior area corresponding to the image. The temperature measurements of the tubes may be performed with an optical pyrometer or other suitable device. The values representing a measure of central tendency from the image, which correspond to tubes 104, are then compared to the temperature measurements to establish a correlation or relationship between temperature and pixel value. Other techniques to obtain temperature information on the tubes 104 can also be used to establish the relationship or correlation to pixel values. Once a relationship or correlation between temperatures and pixel values is established, the correlation can be used for subsequent processing of images.

Once the temperature values for each tube 104 in each image is determined, the temperature values from the images can be combined together to provide temperature information on all the tubes 104 in furnace 102. The temperature value from each tube 104 in each image is extracted and used to generate a representation of temperature information for all of the tubes 104 of the furnace 102. Where a particular tube 104 has several temperature values as a result of the tube 104 being in more than one image, the temperature values may be averaged using a statistical averaging technique, for example, average, weighted average, etc. The uncertainty of the temperature values may be included as a factor when calculating a weighted average. Once the extraction and processing of the temperature values from the images is complete, a temperature value for each tube 104 in the furnace 102 may be displayed.

Instead of determining a temperature value for each tube 104 in each image, the segment pixel data or the values representing a measure of central tendency may be continued to be processed in a manner similar to that discussed above (including the application of uncertainty values) to generate a representation of the furnace 102 in pixel data or statistical values. The pixel data or values representing a measure of central tendency in the representation of the furnace can then be converted to temperatures using the relationship or correlation discussed above to obtain a representation of the furnace based on temperature values.

A multivariate regression method (such as Partial Least Squares) may be used to establish a correlation between the temperature of the specific tubes for which independent temperature measurements are available and the pixel data from an image. The correlation can incorporate variables including, but not limited to, channel pixel values, for example, R, G, B values, d, α, other suitable quantifiable measurements, and/or combinations thereof. For example, the correlated value of the tube temperature can be represented as $\hat{T}_j$ (for tube j) and the independent variables as $x_{ij}$, where i denotes the $i^{th}$ variable, from a partial list of variables where $$x \in \left\{R, G, B, \frac{1}{d}, \frac{1}{d^2}, \alpha, ...\right\}.$$

Other variables associated with the tube temperature may include the R, G, B of the previous and next tubes. The tube 104 temperature at a predetermined location can be represented as a linear combination of these variables with unknown coefficients $A_i$ such that $\hat{T}_j = \Sigma_i A^i x_{ij}$. Given a set of independent temperature measurements, $T_j$, where j=1, 2, . . . n, which can come from a pyrometer, the unknown coefficients can be determined by minimizing the error between the actual data and the prediction in the least squares sense:

$$\underset{j=1,n}{\text{Min}}\{(T_j - \hat{T}_j)^2\} = \underset{j=1,n}{\text{min}}\left\{\left(T_j - \sum_i A_i x_{ij}\right)^2\right\}.$$

These evaluations can be systematically performed with the aid of standard statistical and mathematical software tools (for example, Matlab®). The final result of the evaluations can generate a correlation between data from image and temperatures of tubes 104 in the least squares sense $\hat{T}_j = \Sigma_i A_i x_{ij}$ allowing temperature estimates for all tubes in the images (not just those for which independent temperature measurements are available).

Temperature information regarding the tubes 104 of furnace 102 may be displayed as a contour plot or other suitable (color) graphic representation. The plot can identify individual process tubes and rows.

The process for obtaining temperature information disclosed herein may be applied to a plurality of elevations within furnace 102 and may be used to generate a three-dimensional view or representation of temperature data. View ports 110 can be located in upper and lower portions of furnace 102. Performing the process discussed above with both view ports in the upper and lower portions of furnace 102 permits the generation of a plot for the upper portion and the lower portion of furnace 102. Additional calculations incorporating anticipated differences in temperature at the various elevations may be incorporated into a three-dimensional plot. Incorporating the anticipated differences in temperatures permits the plot to account for anomalies with specific tubes 104. Multiple rows of segments at different elevations may be analyzed from images. The use of multiple segments at different elevations can also be used to generate a three-dimensional representation of temperature information.

Embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred, or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general-purpose computer, special purpose computer, or special purpose processing machines to perform a certain function or group of functions.

The method of operating the furnace further comprises providing an estimate of a mathematical function characterizing a relationship between burner flow rate changes for two or more of the plurality of burners and individual temperature changes for at least a portion of the plurality of process tubes. Each burner may have several flows that pass through it. These include both fuel streams and oxidant streams and it may be possible to control the flows of these streams to individual burners or to proper subsets of burners (such as a single row of burners). Altering the flow of one of these streams (by for example, increasing or decreasing the fractional opening of a valve in the flow path) will affect the temperatures of one or more tubes in the furnace. Such a change is not intended to affect the overall flows of fuels and oxidants to the furnace as a whole, only the distribution of such flows within the furnace. In general terms, the relationship between a single flow rate change ($\Delta u_i$ for stream i, where i is an index specifying each stream in the plurality of streams which affect the distribution of fuel or oxidants within the furnace; the total number of such streams is designated $N_{stream}$) and the change in temperatures of the tubes ($\Delta T_j$ for all j where j is an index specifying each of tube in the plurality of tubes in the furnace which are considered in the calculation) is represented as $$\Delta \underline{T} = \underline{f}(\Delta u_i),$$

where the underbar is used to denote a vector quantity. In this case, a vector of length $N_{tube}$, the number of tubes of the portion of the plurality of tubes in the furnace that are controlled (and which may, but does not have to, equal the total number of tubes in the furnace). So this vector equation represents the $N_{tube}$ individual general functional relationships between the flow rate change of a single fuel or oxidant stream and the temperature of the $N_{tube}$ tubes.

It is often convenient to balance the furnace in stages where a single fuel or oxidant stream is adjusted in each stage. The streams may then be designated a specific order in which they are to be used for balancing. If a burner has 3 fuel streams, they could be designated fuel1, fuel2 and fuel3. If there are 2 oxidant streams they could be designated oxidant1 and oxidant2. The total number of stream types may be designated $M_{streams}$. During the first stage, fuel1, by itself, may be adjusted to balance the furnace. All the balancing may be done in a single stage (i.e., using just one stream for balancing even if multiple adjustment steps or iteration are required) or subsequent stages may use the other streams to further improve the furnace balance. In either case, when using the staged approach the only functional relationships needed within a stage are those between the change in tube temperatures ($\Delta T_j$) and the change of a single stream type as it flows through the plurality of burners ($\Delta u_I$). The upper-case index I is used to designate the burner through which the specific stream flows and runs from 1 to the number of the plurality of burners ($N_{burner}$) considered. In general, the total number of streams flowing through all the burners is equal to the product of the number of stream types and the number of burners (i.e., $N_{stream} = M_{stream} \times N_{burner}$). It is also possible to define a one-to-one correspondence between the index i used to designate any stream and a compound index $I_m$ where I designate the burner and the subscript m designates the stream type. In this way stream i is associated with burner I and if the method is applied in the stage-wise manner, the indexes are identical and used to identify a specific burner stream. The lower-case index will be use to designate a burner stream and the upper case index the corresponding burner through which it flows. Equations for the stage-wise approach could be generated in a more explicit form by replacing the lower case i with the upper-case I.

Any function can be linearized so that for small changes in the independent variable a constant value accurately represents the change in the dependent variable. This is the first derivative and in this case may be represented as $$\frac{\partial T_j}{\partial u_i}.$$

Here the symbol $\partial$ is used to represent the partial derivative since the temperature of the tube wall is taken as a function of many independent variables (the $u_i$'s, which are the controllable stream flows). The symbol $g_{ij}$ is defined herein as the estimate of $$\frac{\partial T_j}{\partial u_i}.$$

The function which represents the relationship between two or more of the plurality of flow streams to the burner and the tube wall temperatures is represented as $$\Delta \underline{T} = \underline{f}(\Delta \underline{u})$$

This is shorthand for a series of $N_{tube}$ equations each of which provides the change in tube wall temperature for a specific tube as a function of changes to all the flow streams. A single exemplary equation may be written as $$\Delta T_j = f_j(\Delta \underline{u}) = f_j(\Delta u_1, \Delta u_2, \Delta u_3, \ldots, \Delta u_{N_{streams}}).$$

After linearizing the function, the single exemplary equation may be written as $$\Delta T_j = \sum_{\forall i} \frac{\partial T_j}{\partial u_i} \Delta u_i.$$

After replacing $$\frac{\partial T_j}{\partial u_i}$$

with the estimated value $g_{ij}$, the single exemplary function may be written as $$\Delta T_j = \Sigma_{\forall i} g_{ij} \Delta u_i.$$

There are $N_{tube}$ of these individual equations, one for each of the portion of the plurality of tubes in the furnace which are controlled. Together these $N_{tube}$ equations maybe written in shorthand as $$\Delta \underline{T} = \underline{\underline{G}} \Delta \underline{u}$$

where $\underline{\underline{G}}$ is a matrix with functional elements $g_{i,j}$ and dimensions $N_{stream} \times N_{tube}$.

It remains to determine values for $g_{i,j}$. This can be arduous, repetitive work if tackled experimentally. However, there are features in a typical furnace that can be exploited to simplify the task. Specifically, tubes that are near a burner in which the fuel flow is increased see an increase in the temperature and a larger increase than those that are more distant. Tubes that are remote from the burner that sees an increase in fuel may see no change or even a decrease in temperature as burners nearer the remote tube experience a slight decrease in fuel flow (as the total fuel flow to the furnace is unchanged). This suggests certain functional forms for the functional elements $g_{i,j}$ which provide estimates of $$\frac{\partial T_j}{\partial u_i}.$$

For example, the functional form $$g_{i,j} = a_1 \times \exp\left(\frac{a_2}{d_{I,j}}\right) + a_3,$$

where $d_{I,j}$ is the distance between tube j and burner I (note that the upper case I is used to designate the burner through which stream i flows as described previously) may be used. This form has three parameters ($\alpha_1$, $\alpha_2$ and $\alpha_3$). In the most general sense, parameters could be determined for each tube/stream pair and as functions of operating and environmental conditions, but this approach does not exploit the power of this methodology. Another approach is to assume that the parameters ($\alpha_1$, $\alpha_2$ and $\alpha_3$) are valid for every tube/stream pair within specific classes. For example burners may have two separate fuel streams and one set of parameters ($\alpha_1$, $\alpha_2$ and $\alpha_3$) may be determined for each fuel stream separately. Burners within the furnace may be of different sizes and a set of parameters may be determined for each fuel stream for each size burner. Since the estimates need not be perfect, it may be desirable to limit the number of different classes and accept a level of inaccuracy in the estimated response rather than devote additional work to parameter determination for more classes.

Therefore, in the method, the estimate of the mathematical function (e.g. $\Delta \underline{T} = \underline{\underline{G}} \Delta \underline{u}$) may comprise calculated values from functional elements ($g_{i,j}$) wherein each of the functional elements ($g_{i,j}$) comprise a functional form $$\left(\text{e.g. } g_{i,j} = a_1 \times \exp\left(\frac{a_2}{d_{I,j}}\right) + a_3\right)$$

comprising a first functional parameter, $\alpha_1$, a second functional parameter, $\alpha_2$, and a geometric parameter, $d_{i,j}$, characterizing distances between each of the plurality of process tubes and each of the plurality of burners; wherein the first functional parameter, $\alpha_1$, of a first functional element of the functional elements has the same value as the first functional parameter $\alpha_1$, of a second functional element of the functional elements and wherein the second functional parameter, $\alpha_2$, of a first functional element of the functional elements has the same value as the second functional parameter, $\alpha_2$, of a second functional element of the functional elements.

Figure 5:
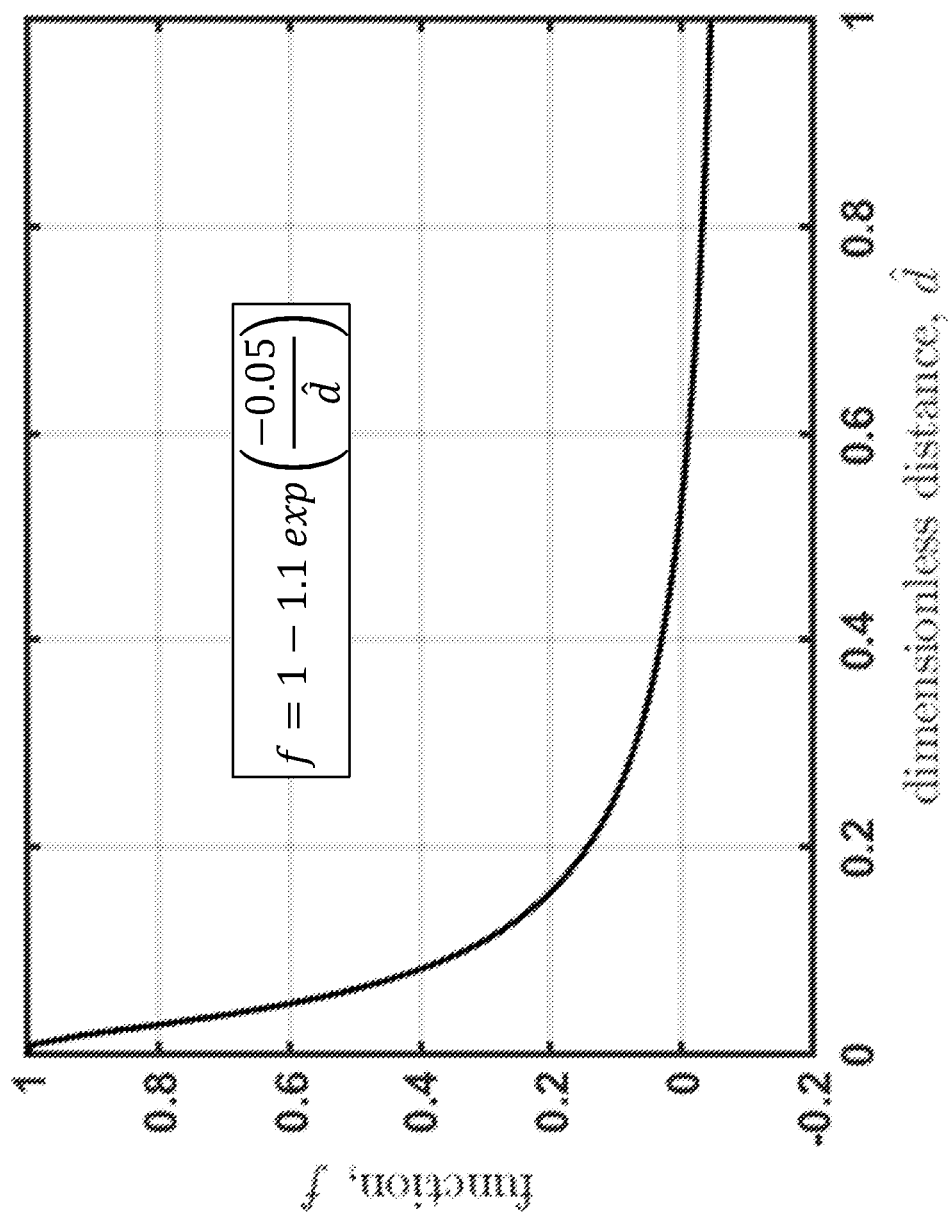
FIG. 5 is a plot of an example function.

If $g_{i,j}$ is non-dimensionalized by dividing by a reference stream flow change and multiplying by a reference tube temperature change, and $d_{I,j}$ is non-dimensionalized by dividing by a furnace length scale then a set of parameter values that has the form described above is $\alpha_1 = -1.1$, $\alpha_2 = -0.05$ and $\alpha_3 = 1$ (these values have been chosen as a representative example and are not intended to describe any specific furnace nor to limit the method in any way). FIG. 5 is a plot of this example function with the given parameter values. With dimensionless values, $\alpha_3$ may be appropriately chosen to equal 1. Larger absolute values of $\alpha_2$ restrict the direct effect of flow changes to a smaller neighborhood around the burner. $\alpha_1$ may be chosen to be less than $-1$. More complex forms of the functional elements may also be selected, for example, $$g_{i,j} = a_1 \tan^{-1}\left(\frac{a_2}{d_{I,j}} + \frac{a_3}{d_{I,j}^2}\right) + a_4.$$

Here, the functional element $g_{i,j}$ has 4 parameters and this function can more closely match experimental data. Other functional forms may be chosen as well.

The parameter values ($\alpha_k$) used to determine the value of the functional elements for each specific class can be updated as additional information regarding the effect of burner stream flow rate changes on tube temperature changes is obtained. This is done by performing the following minimization:

$$\underset{\forall a_k}{\text{Min}} \left\| (\Delta \underline{T} - \underline{\underline{G}} \Delta \underline{u}) \circ \underline{\varepsilon}^{-1} \right\|$$

where $\underline{\varepsilon}^{-1}$ is a vector (of dimension $N_{tube}$) in which each element is the reciprocal of the uncertainty in the tube temperature measurement, the ° operator is used for the point-wise product (a.k.a. Hadamard product) of the two vectors. If matrix $\underline{\underline{G}}$ is ill conditioned, it may be reconditioned by dropping some of the smaller eigenvalues.

As indicated above, the relationship between tube wall temperature changes and changes in the burner flow may be affected by operating conditions (e.g., production rate) or environmental conditions (e.g., ambient temperature). These effects can be captured by changing the parameter values ($\alpha_k$). However, the values determined for previous conditions provide a reasonable estimate and a good starting point for the mathematical function relating tube wall temperature changes to changes in the burner flows. As changes are made to the burner stream flows, the parameters may be updated as described above.

The method of operating a furnace further comprises calculating a first target flow rate solution set having solutions for the two or more of the plurality of burners consistent with conforming temperatures of the plurality of process tubes to the temperature uniformity limitation for the plurality of process tubes. Mathematically, this is done by first constructing a vector representing the difference between the current tube temperatures (labeled $T_j \forall j$ or simply $\underline{T}$) and the target temperatures ($T_j^*$ for $\forall j$ or simply $\underline{T}^*$) of the form $\underline{T}-\underline{T}^*$ (or $\Delta \underline{T}^*$) and then determining the solution ($\Delta \underline{u}$) which conforms to the linearized function which estimates the relationship between changes in tube wall temperatures and burner flows subject to the constraint that the determined values ($\Delta u_i$) lie between the lower and upper bounds on the individual burner flows. Symbolically this is $$\underset{\substack{\Delta \underline{u} \\ s.t.\ LB_i \leq \Delta u_i \leq UB_i \forall i}}{\text{Min}} \|\Delta \underline{T}^* - \underline{\underline{G}}\Delta \underline{u}\|$$

where the generic symbol $\|x\|$ is used to designate any of the variety of optimization targets such as the 2-norm discussed previously. $T_j^*$ may equal T or be related to T as described previously. $\underline{\underline{G}}$ may be reconditioned.

The solution ($\Delta \underline{u}$) is a set of burner flow changes that minimize the difference between the estimated tube wall temperatures and the target temperatures. These conforming flow changes can be implemented as valve adjustments. When this is done a new temperature profile will appear in the furnace. The tube temperatures can be measured as described above along with corresponding uncertainty values. The new temperature information may then be used to estimate new values for the parameters in $g_{i,j}$, as well as determine a new $\Delta \underline{T}$ * so that the process may be repeated to further refine the temperature profile.

The target flow rate solution set may be any measure relating to burner flow rates, e.g. specific oxidant gas and/or fuel flow rates, changes in flow rates, percent opening/closing of valves, etc. Conforming may be by any suitable technique for decreasing the difference between the measured temperatures and the temperature target.

As described above, the temperature values or temperature information may include uncertainty values ($\varepsilon_j$). To incorporate the uncertainty in tube wall temperature, the minimization process by which the conforming flows are determined is modified to include a weighting of the individual vector elements with the reciprocal of the uncertainty. This is similar to how the uncertainty was used to compute the parameter values in the estimate of the individual function elements. Symbolically, this is $$\underset{\substack{\Delta \underline{u} \\ s.t.\ LB_i \leq \Delta u_i \leq UB_i \forall i}}{\text{Min}} \|\Delta \underline{T}^* - \underline{\underline{G}}\Delta \underline{u} \cdot \underline{\varepsilon}^{-1}\|.$$

The modification encompasses differentiation in uncertainty that may or may not be present in different tube wall temperatures. The resulting solution puts more emphasis on moving valves when the uncertainty associated with the related temperature is low compared to cases when the uncertainty is higher.

The most obvious constraints on burner flows are minimum and maximum flows. These could be specified to maintain some minimum fuel flow consistent with burner stability or maximum fuel flow associated with fuel-rich combustion and emissions limits. These flow constraints may be recast in terms of valve position constraints to be consistent with the case in which the $\Delta u_i$'s are considered to be valve position changes. There are also additional constraints which may be included. For example a constraint could be imposed on the number of valves that are allowed to be manipulated for each step of calculating a target flow rate solution set.

The method of operating the furnace 102 further comprises adjusting a first valve upstream of at least one of the two or more of the plurality of burners 108 to change at least one of the flow rates of the two or more of the plurality of burners 108 in accordance with the first target flow rate solution set. Reference to a first valve includes one or more valves since the article "a" means one or more when applied to any feature. The first valve may be a valve controlling the flow of oxidant gas or a valve controlling the flow of fuel gas. The first valve may be an actuated valve or manual valve. The first valve that is adjusted is not a main oxidant gas or main fuel valve for controlling the total flow to the entire furnace which is controlled by traditional methods rather it is a valve that controls the flow to a proper subset of the burners and therefore affects the distribution of flow.

The method of operating the furnace 102 may further comprise measuring second temperature information for the plurality of process tubes at a second operating condition different from the first operating condition. The second operating condition is subsequent (at a later time) to the first operating condition.

The second temperature information may be measured in a manner similar to the first temperature information.

In combination with any of the other features, the second temperature information of the plurality of process tubes may be measured by capturing a second plurality of images of an interior area of the reformer furnace, at least some images of the second plurality of images being associated with different portions of the interior area of the reformer furnace, wherein each image of the second plurality of images comprises second pixel data associated with a respective portion of the plurality of process tubes, and processing a portion of the second pixel data to obtain the second temperature information for the plurality of process tubes.

The second operating condition may be the result of open loop testing of the temperature response of oxidant gas/fuel flow rates to the burners. Open loop testing includes the case where a single burner flow stream is adjusted specifically for the purpose of determining the parameters used to define the functional elements for a specific class of burner flows. The parameter estimates may be calculated using the first temperature information and the second temperature information resulting from the burner flow rate change(s). If $_0\underline{T}$ is used to designate the measured temperatures at the initial condition and $_1\underline{T}$ is used to designate the measured temperatures at the subsequent condition then $\Delta \underline{T} \equiv {_1\underline{T}} - {_0\underline{T}}$ and the parameters are determined from $$\underset{\forall a_k}{\text{Min}} \|(\Delta \underline{T} - \underline{\underline{G}}\Delta \underline{u}) \cdot \underline{\varepsilon}^{-1}\|$$

where the elements of $\underline{\varepsilon}^{-1}$ are defined as $$\varepsilon_i^{-1} = \frac{1}{\sqrt{{_1\varepsilon_j^2} + {_0\varepsilon_j^2}}}$$

and $\Delta \underline{u}$ is a vector with only one non-zero element ($\Delta u_j$) corresponding to the burner flow stream that was adjusted for the open loop test. Any number of open loop tests may be conducted to obtain more temperature information ($_2\underline{T}, _3\underline{T}, \ldots$) to validate the form of the functional element chosen for $g_{ij}$, refine the parameter estimates, to develop parameter estimates for additional classes of burner flows or at different operating conditions.

Alternatively to open loop testing, the second operating condition where the second temperature information is measured may be the result of adjusting the first valve in accordance with the first target flow rate solution set. With each adjustment of one or more valves, additional temperature information may be measured and the results used to update the parameter estimates.

The method of operating the furnace 102 may further comprise calculating a second target flow rate solution set having solutions for the two or more of the plurality of burners consistent with conforming temperatures of the plurality of process tubes to the target temperature criterion using the estimate or an updated estimate of the mathematical function and using the second temperature information for the plurality of process tubes. The estimate of the mathematical function or an updated estimate of the mathematical function is evaluated using the values provided in the second temperature information to calculate the second target flow rate solution set. The second target flow rate solution set has updated or second solutions for the two or more of the plurality of burners. The same estimate of the mathematical function used previously could be used to calculate the second target flow rate solution set or an updated estimate of the mathematical function could be provided based on the new temperature information. In case an updated estimate of the mathematical function is used, the estimate of the mathematical function is updated from the second temperature information. The mathematical function is updated by re-estimating the parameters of the functional element ($\alpha_k$) using the new information from the second temperature data. In the case that there are multiple conditions resulting in multiple temperature readings and multiple valve positions, the result is combined by $$\underset{\forall a_k}{\text{Min}} \sum_{\forall l} \left\| (\Delta_l \underline{T} - \underline{\underline{G}} \Delta_l \underline{u}) \cdot \underline{l \varepsilon}^{-1} \right\|,$$

where l is the index identifying each of the different conditions evaluated.

Constraints related to minimum and/or maximum allowable valve positions may be taken into account for estimating the next control action. The constraint may be a physical constraint (i.e. full open or full closed valve). The constraint may be based on experience that a valve should not be open or closed beyond a certain position. Other constraints maybe due to total number of burners allowed to be moved at each iteration, or the total number of valves allowed to be closed, or maximum change in back pressure that is allowed.

After the second target flow rate solution set is calculated, the method of operating the furnace may then further comprise adjusting the first valve or a second valve upstream of at least one of the two or more of the plurality of burners to change at least one of the flow rates of the two or more of the plurality of burners in accordance with the second target flow rate solution set. The first valve or the second valve that is adjusted is not a main oxidant gas or main fuel valve for controlling the total flow to the entire furnace which is controlled by traditional methods rather it is a valve that controls the flow to a proper subset of the burners and therefore affects the distribution of flow.

The furnace may be operated to first adjust the header valves regulating each row of burners followed by adjusting individual burner valves regulating each individual burner.

The plurality of burners may comprise two or more rows of burners and the first valve that is adjusted in response to the first target flow rate solution set may be upstream of a first row of burners. A row of burners is a plurality of burners connected to a common header and having outlets arranged in a substantially straight line. The second valve that is adjusted in response to the second target flow rate solution set may be upstream of a single burner of the two or more of the plurality of burners to change at least one of the flow rates of the single burner in accordance with the second target flow rate solution set. Since the second valve regulates only a single burner, the second valve is not upstream of any burner other than the single burner.

Defining classes of burner flow streams and representing the change in tube wall temperature to changes in burner flow streams with a unique expression for each class is a powerful tool which exploits the regular geometric pattern of the furnace and allows the gain matrix to be more fully populated with relatively few perturbations (i.e., one for each class). FIG. 1 shows that tubes 14 which surround burner 16 are in a similar relationship as tubes 24 which surround burner 26. it is expected that tubes 24 will respond to changes in burner 26 in much the same manner that tubes 14 respond to changes in burner 14. This expectation has been verified experimentally. Likewise, defining each element of the gain matrix based on a functional form that is related to geometric considerations (the distance between the burner and the tube) further enhances the efficiency of the method. This ensures that relatively minor effects on distant tubes are considered even if only approximately. The sum of the minor effects can be significant, so ignoring these altogether makes the ultimate solution of this large dimensional problem less efficient.

In an embodiment, after calculating a target flow rate solution set, valves upstream of each burner may be adjusted one at a time, temperature information measured after each adjustment, and the temperature information measured after each adjustment used to update the estimate to the mathematical function. The update to the estimate of the mathematical function may be made after some or all of the earlier prescribed changes of the previous target flow rate solution set have been made. This approach has the benefit of more readily improving the estimate of the mathematical function.

In this embodiment, the first valve is upstream of a lone first burner of the two or more of the plurality of burners. The method may then further comprise measuring second temperature information for the plurality of process tubes at a second operating condition wherein the second operating condition results from adjusting the first valve, adjusting a second valve in accordance with the first target flow rate solution set wherein the second valve is upstream of a lone second burner of the two or more of the plurality of burners, measuring third temperature information for the plurality of process tubes at a third operating condition wherein the third operating condition results from adjusting the second valve in accordance with the first target flow rate solution set, updating g the estimate of the mathematical function from the second temperature information and the third temperature information thereby forming the updated estimate of the mathematical function, calculating a second target flow rate solution set having solutions for the two or more of the plurality of burners consistent with conforming temperatures of the plurality of process tubes to the target temperature criterion using the updated estimate of the mathematical function; and adjusting at least one of the first valve, the second valve or a third valve upstream of the two or more of the plurality of burners to change at least one of the flow rates of the two or more of the plurality of burner in accordance with the second target flow rate solution set wherein the third valve is not upstream of all burners in the reformer furnace.

The method of operating the furnace may further comprise adjusting burner flows to minimize the variance of excess oxygen in the combustion product gas stream leaving the furnace.

The furnace has an exhaust for withdrawing a combustion product gas stream and may comprise a plurality of oxygen concentration sensors operatively disposed to sense the oxygen concentration in the combustion product gas stream, the plurality of oxygen concentration sensors spatially positioned to detect oxygen concentration changes responsive to changes in the flow rates of individual burners or groups of burners, The method may further comprise:
(a') selecting target oxygen concentration criterion pertaining to the plurality of oxygen concentration sensors;
(b') measuring first oxygen concentration information comprising data for each of the plurality of oxygen concentration sensors at the first operating condition;
(c') providing an estimate of a second mathematical function characterizing a relationship between burner flow rate changes for two or more of the plurality of burners and individual oxygen concentration changes for the plurality of oxygen concentration sensors; and
(d') calculating a first excess oxygen-related target flow rate solution set having solutions for the two or more of the plurality of burners consistent with conforming oxygen concentrations measured by the plurality of oxygen concentration sensors to the target oxygen concentration criterion for the plurality of oxygen concentration sensors using the estimate of the second mathematical function and the first oxygen concentration information;
(e') wherein the first valve upstream of at least one of the two or more of the plurality of burners is adjusted to change at least one of the flow rates of the two or more of the plurality of burners in accordance with the first target flow rate solution set and the first excess oxygen-related target flow rate solution set.

The first valve may be adjusted in accordance with the first target flow rate solution set and the first excess oxygen-related target flow rate solution set using a weighting function for the first target flow rate solution set and the first excess oxygen-related target flow rate solution set.

Figure 6:
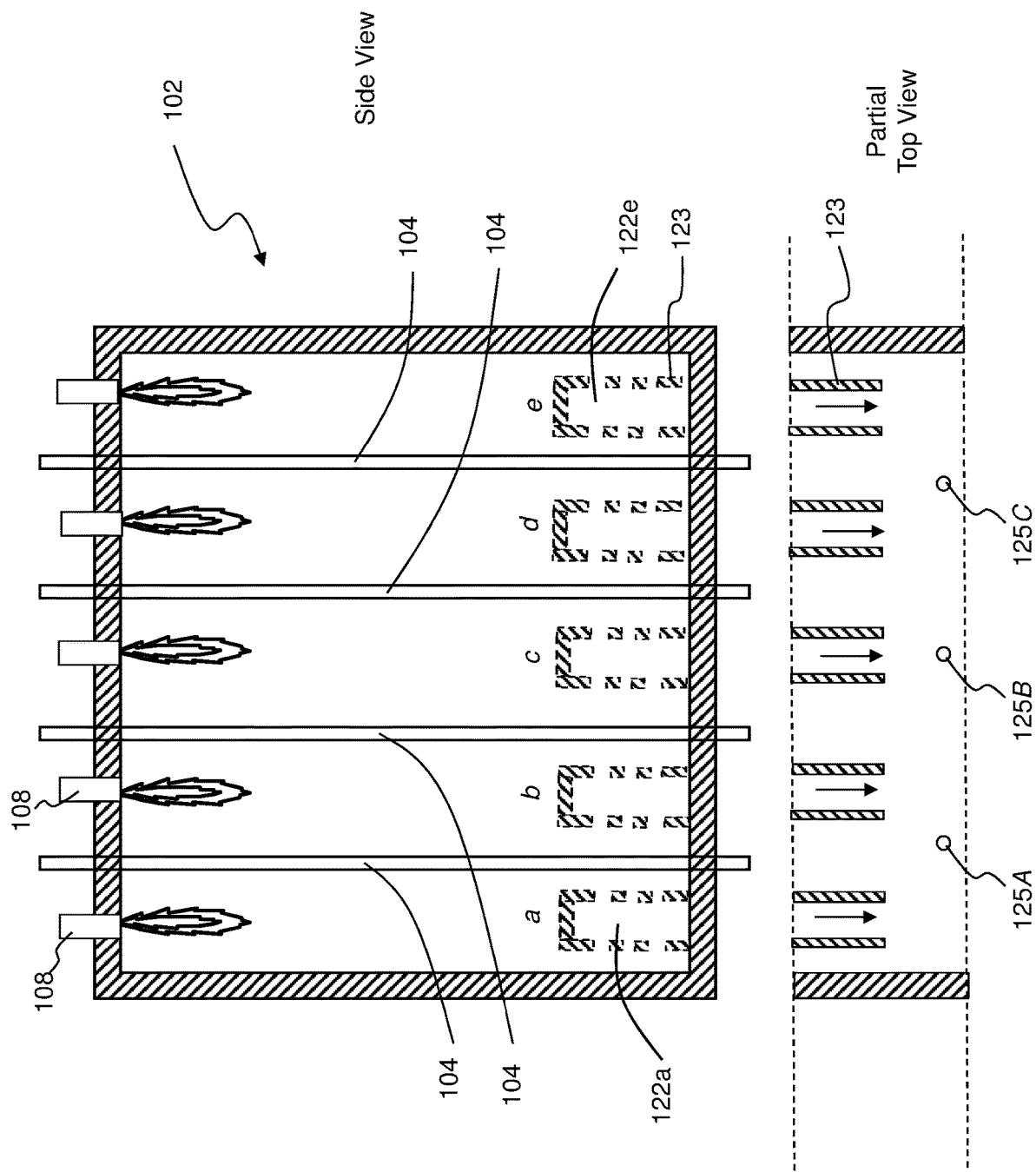
FIG. 6 is a schematic of a reformer for describing the excess oxygen model.

FIG. 6 illustrates a reformer furnace for describing the excess oxygen model. FIG. 6 shows side view and a partial top view of a reformer furnace 102 with burners 108, reformer tubes 104, and tunnels 122 with tunnel walls 123. The reformer furnace 102 in FIG. 6 shows 5 burner rows (i=a, b, c, d, e) and 5 tunnels 122 (i=a, b, c, d, e). Combustion product gases pass into the tunnels 122 where the combustion gases are transferred out of the furnace combustion section to the convection section. At the exit end of the tunnels, the furnace in FIG. 6 is illustrated with three oxygen sensors 125A, 125B, and 125C where the amounts of excess oxygen are measured and recorded.

For each row of burners, there is a corresponding tunnel and tunnel outlet where the oxygen concentration provides an indication of the amount excess oxygen used for combusting the fuel for that row of burners. Higher excess oxygen tells that the ratio of fuel to air needs to be raised to increase the combustion efficiency. Changes in stream flow rates of the burners, for which the above-mentioned target flow rate solution set would provide solutions to approach the target tube segment temperature criterion, can also affect the outlet oxygen concentration values. An oxygen sensor 125 for each tunnel may be preferable, but is not necessary. Information regarding the combustion conditions for each row of burners can be determined from fewer oxygen sensors.

In the present method, the target oxygen concentration criterion pertaining to the plurality of oxygen concentration sensors may be selected where the target oxygen concentration criterion comprises one or more objective functions.

Various objective functions can be defined that characterize the excess oxygen concentrations of the combustion product gases leaving the furnace.

For example, an objective function for excess oxygen concentrations may characterize the variance of excess oxygen across all oxygen sensors. This objective function may be written mathematically as:

$$F_{O_2} = \sqrt{\frac{\sum_j (C_{O_2,j} - \overline{C_{O_2}})^2}{N_{sensor} - 1}}, \text{ where } \overline{C_{O_2}} = \frac{\sum_{j=1}^{N_{sensor}} C_{O_2,j}}{N_{sensor}},$$

where $C_{O_2,j}$ is the excess oxygen measurement for the jth oxygen sensor and $N_{sensor}$ is the total number of oxygen sensors. Successful control of the excess oxygen variance across tunnels would help reduce the spread of excess oxygen and thus potentially facilitate manipulation of the excess oxygen for the entire furnace.

The excess oxygen model may assume that the gain from the burner flow rate to the tunnel outlet oxygen concentration is constant. This may be described mathematically as:

$$\frac{\Delta C_{O_2,i}}{\Delta F_i} = \text{constant} = \beta,$$

where i is the index of the tunnel.

The excess oxygen model may also assume that there is a linear mixing relationship between the individual tunnel oxygen and the oxygen sensors. This may be described mathematically as:

$$\sum_i \beta_{i,j} = 1, \forall j.,$$

where $\alpha_{ij}$ represents the linear coefficient associating the ith tunnel with the jth oxygen sensor. In FIG. 6, i=a, b, c, d, e; and j=A, B, C. Physically, the coefficients $\alpha_{ij}$ represent the fraction of flow from tunnel i which ends up in the portion of the flow path associated with sensor j.

For embodiments including the objective function for excess oxygen, the global Objective function may be expressed:

$$F_{global} = W \sum_{m=1}^{M} w_m F_m (1-W) F_{O_2}$$

where W (in a range from 0 to 1) is the weighting factor which controls the relative weights of the temperature component and the excess oxygen component. By adding the minimization of excess oxygen variance into the optimization problem, this allows for adjustment of the burner flow rates to minimize objective function encompassing both the temperature and oxygen balance, making the operation of the furnace more reliable and more efficient at the same time.

The estimate of the second mathematical function may be represented as $$\Delta C_{O_2,j} = \beta \sum_i \alpha_{i,j} \Delta u_i$$

where $\Delta C_{O_2,j}$ represents the change in oxygen concentration at sensor, j, $\Delta u_i$ represents the sum of burner flow rate in burner row i and $\beta$ and $\alpha_{i,j}$ are parameters which have been identified experimentally. Since each burner row has a corresponding tunnel, there is a one-to-one relationship between the burner rows a through e and tunnels a through e.

The parameters and $\beta$ and $\alpha_{i,j}$ may be done experimentally by processing data from a series of experiments in which burner flow rate changes $\Delta u_i$ were made in each tunnel i and the resulting oxygen concentration changes $\Delta C_{O_2,j}$ were measured. This may be done by assuming a nonnegative value for $\beta$, and then solving the quadratic program $$\min_{\alpha_{i,j}} \sum_j \left( \Delta C_{O_2,j} - \sum_i \alpha_{i,j} \Delta u_i \right)^2$$

$$\text{subject to } \sum_i \alpha_{i,j} = \beta, \forall\ j,$$

$$0 < \alpha_{i,j} < \beta, \forall\ i, j.$$

The quadratic program finds the optimal values for $\alpha_{i,j}$, given the assumed $\beta$, and this procedure may be repeated for a range of assumed $\beta$ to find the $\beta$ that best fits the experimental data.

The method may further comprise:
measuring second oxygen concentration information comprising data for each of the plurality of oxygen concentration sensors at the second operating condition or a third operating condition different from the first operating condition; and
wherein the estimate of the second mathematical function provided in step (c') is calculated using the first oxygen concentration information and the second oxygen concentration information.

The method may further comprise:
measuring second oxygen concentration information comprising data for each of the plurality of oxygen centration sensors at the second operating condition or a third operating condition different from the first operating condition and wherein the second operating condition or third operating condition are subsequent to the first operating condition;
calculating a second excess oxygen-related target flow rate solution set having solutions for the two or more of the plurality of burners consistent with conforming oxygen concentrations measured by the plurality of oxygen concentration sensors to the target oxygen concentration criterion from the plurality of oxygen concentration sensors using the estimate or an updated estimate of the second mathematical function and using the second oxygen concentration information; and adjusting the first valve or a second valve upstream of at least one of the two or more of the plurality of burners to change at least one of the flow rates of the two or more of the plurality of burners in accordance with the second excess oxygen-related target flow rate solution set wherein the second valve is not upstream of all burners of the reformer furnace.

The second operating condition or third operating condition may result from conducting step (e').

The method may further comprise:
updating the estimate of the second mathematical function from the second oxygen concentration information thereby forming the updated estimate of the second mathematical function; and
the step of calculating the second excess oxygen-related target flow rate solution set may then use the updated estimate of the second mathematical function.

The present disclosure also relates to a second method of operating a furnace having a plurality of burners, each of the plurality of burners having flow rates associated therewith, the furnace containing a plurality of process tubes and having an exhaust for withdrawing a combustion product gas stream, the furnace comprising a plurality of oxygen concentration sensors operatively disposed to sense the oxygen concentration in the combustion product gas stream and spatially positioned to detect oxygen concentration responsive to changes in the flow rates of individual burners or groups of burners.

The second method comprises:
(i) selecting target oxygen concentration criterion for the plurality of oxygen concentration sensors;
(ii) measuring first oxygen concentration information comprising data for each of the plurality of oxygen concentration sensors at a first operating condition;
(iii) providing an estimate of a mathematical function characterizing a relationship between burner flow rate changes for two or more of the plurality of burners and individual oxygen concentration changes for the plurality of oxygen concentration sensors;
(iv) calculating a first excess oxygen-related target flow rate solution set having solutions for the two or more of the plurality of burners consistent with conforming oxygen concentrations measured by the plurality of oxygen concentration sensors to the target oxygen concentration criterion for the plurality of oxygen concentration sensors using the estimate of the mathematical function and the first oxygen concentration information; and
(v) adjusting a first valve upstream of at least one of the two or more of the plurality of burners to change at least one of the flow rates of the two or more of the plurality of burners in accordance with the first excess oxygen-related target flow rate solution set wherein the first valve is not upstream of all burners of the furnace.

The estimate of the mathematical function in the second method may be represented as $$\Delta C_{O_2,j} = \beta \sum_i \alpha_{i,j} \Delta u_i$$

where $\Delta C_{O_2,j}$ represents the change in oxygen concentration at sensor, j, $\Delta u_i$ represents the sum of burner flow rate in burner row i and $\beta$ and $\alpha_{i,j}$ are parameters which have been identified experimentally.

The second method may further comprise:
measuring second oxygen concentration information comprising data for each of the plurality of oxygen concentration sensors at the second operating condition different from the first operating condition; and
wherein the estimate of the second mathematical function provided in step (iii) is calculated using the first oxygen concentration information and the second oxygen concentration information.

The second method may further comprise:
measuring second oxygen concentration information comprising data for each of the plurality of oxygen centration sensors at the second operating condition different from the first operating condition and wherein the second operating condition is subsequent to the first operating condition;
calculating a second excess oxygen-related target flow rate solution set having solutions for the two or more of the plurality of burners consistent with conforming oxygen concentrations measured by the plurality of oxygen concentration sensors to the target oxygen concentration criterion from the plurality of oxygen concentration sensors using the estimate or an updated estimate of the second mathematical function and using the second oxygen concentration information; and
adjusting the first valve or a second valve upstream of at least one of the two or more of the plurality of burners to change at least one of the flow rates of the two or more of the plurality of burners in accordance with the second excess oxygen-related target flow rate solution set wherein the second valve is not upstream of all burners of the reformer furnace.

The second operating condition may result from conducting step (iv).

The method may further comprise:
updating the estimate of the second mathematical function from the second oxygen concentration information thereby forming the updated estimate of the second mathematical function; and
the step of calculating the second excess oxygen-related target flow rate solution set may then use the updated estimate of the second mathematical function.

The present invention will be better understood with reference to the following example, which is intended to illustrate, but not to limit the scope of the invention. The invention is solely defined by the claims.

Example

This example illustrates the method in practice.

Step 1. For a furnace with known tube wall temperature and pigtail temperature limitations, the target objective was selected having equal weighting to minimize the probability of exceeding both the tube design limit temperature and the pigtail design limit temperature.

Step 2. Temperature information at an initial condition, $T_j$, comprising data for each of the plurality of process tubes j was measured using a modified digital camera, where j is 1 through the total number of process tubes visible in the furnace, $N_{tube}$. In this case over 90% of the tubes were visible in the images. The temperature information for the plurality of process tubes was measured by capturing a plurality of images (taking a "picture") of an interior area of the reformer furnace, at least some images of the plurality of images being associated with different portions of the interior area of the reformer furnace, and at least some of the images of the plurality of images were taken at a second elevation, wherein each image of the plurality of images comprises pixel data associated with a portion of the plurality of process tubes. The temperature information for the plurality of process tubes was then obtained by processing a portion of the pixel data. "Pictures" of the tubes were taken and a correlation used to convert the pictures to a temperature value and respective uncertainty. The estimate of the uncertainty in the tube wall temperature was provided by the standard deviation of the estimate of the tube wall temperature and designated as $\varepsilon_j$. The temperatures $T_j$, together at the initial condition form a temperature vector which is designated $_0\underline{T}$. The uncertainties $\varepsilon_j$ together at the initial condition form an uncertainty vector $_0\underline{\varepsilon}$. The initial temperature data showed that for any 0.305 m (1 ft.) section k of any tube temperature $T_{i,j}$, there was an average probability of 0.0051% of $T_{i,j,k}$ above the tube design limit. For the pigtails, the initial temperature data showed that for any estimated pigtail temperature $T_{j,pigtail}$ there was an average probability of 0.0268% of $T_{j,pigtail}$ above the pigtail design limit.

Step 3. An estimate of a mathematical function, $\Delta\underline{T}=\underline{G}\,\Delta\underline{u}$, was made using prior knowledge. The mathematical function characterizes a relationship between the changes in tube wall temperature and the changes in the valve position controlling the flow of fuel1 to an individual burner. $\underline{G}$ is a matrix with $N_{burner}$ columns and $N_{tube} \times N_{segment}$ rows, where $N_{tube}$ is the number of tubes in the furnace and $N_{segment}$ is the number of segments per tube.

The matrix elements $g_{(j,k),l}$ in this example were computed using the formula $$g_{(j,k),l} = \begin{cases} \alpha_1 * \left(e^{\alpha_2 * \sqrt{x_{l,j}^2+y_{l,j}^2}} + \alpha_3\right) & 0 \le z_{j,k} \le z_f \\ \alpha_1 * \left(\frac{z_{j,k}}{z_f}\right)^{\alpha_4} * \left(e^{\alpha_2 * \sqrt{x_{l,j}^2+y_{l,j}^2}} + \alpha_3\right) & z_{j,k} > z_f \end{cases}$$

where the functional elements $g_{(j,k),l}$ are the gains for a change in valve position (measured in ° C./percent valve opening) associated with fuel stream in burner l and segment k of reactor tube j. $z_{j,k}$ is the height of the tube segment k for tube j from the top of the tube, and $z_f$ is the length of the flame. Parameters $\alpha_1$, $\alpha_2$, $\alpha_3$, and $\alpha_4$ correlate the relationship between the burner flow rates and the reactor tube temperatures. The initial values of $\alpha_1$, $\alpha_2$, $\alpha_3$, and $\alpha_4$ were 80 (° C./%), −0.5, 0 (° C./%), and 1, respectively. The initial values of $\alpha_1$, $\alpha_2$, $\alpha_3$, and $\alpha_4$ were provided based on estimates. The valve position is related to the fuel stream flow via a valve curve (which describes the resistance of the valve), the pressure differential and the physical properties of the fluid. Mathematically this conversion is achieved by application of the chain rule. In this example, the actual stream flow change was not computed; rather the change in valve position which affects the flow was the determined variable.

Step 4. The measured tube temperatures, $\underline{T}$, uncertainty vector $\underline{\varepsilon}$, the current estimate of $\underline{G}$, and a weighting function w were used to estimate the changes in valve position that will determine the flow of fuel1 to each burner, $\Delta\underline{u}$ that best satisfied the target objective criterion. The chosen objective is an equal weighted combination of minimizing the probability that tube wall temperatures are below design temperature limits, and pigtail temperatures (estimated using tube segments below the lower view port height) are below the pigtail design temperature limit. The change in the valve position which controls the flow of fuel stream fuel1 through each burner is calculated such that $$\underset{\substack{\Delta \underline{u} \\ s.t.\ LB_i \le \Delta u_i \le UB_i \forall i}}{\text{Min}} \frac{\sum_{j=1}^{N_{tube}} \sum_{k=1}^{K} p_{j,k}}{N_{tube} \times K} + \frac{\sum_{j=1}^{N_{tube}} p_{j,pigtail}}{N_{tube}}$$

subject to a limitation for a lower bound, $LB_i$ of 50% open and an upper bound, UB of 100% open for each $\Delta u_j$. We have found that including an additional constraint that limits the number of valve changes to a maximum of 6 allows for easier practical implementation. A single iteration of valve adjustment was sufficient in minimizing the objective to acceptable value, whereby additional adjustment would have only minimal incremental improvement.

Step 6. Five valve changes associated with the conforming solution are made to the burner valves. After the effect of the burner stream flow rate changes on tube temperatures occurred (we waited a minimum of 2 hours after the adjustments), additional tube temperature information comprising data for each of the tubes was collected using the modified digital camera like in step 2. "Pictures" of the tubes were taken and a correlation used to convert the pictures to temperature values at a second condition, represented as a vector, $_1\underline{T}$, with corresponding uncertainty vector $_1\underline{\varepsilon}$ for each of the plurality of process tubes.

Step 7. After the valve adjustment, the temperatures extracted from the pixel data produced the final objective result of an average probability of $6e^{-4}$% of $T_{i,j,k}$ above the tube design limit and for the pigtails, the final temperature data showed that for any estimated pigtail temperature $T_{j,pigtail}$ there was an average probability of 0.005% of $T_{j,pigtail}$ above the pigtail design limit.

Step 8. Given the new temperature data, $_1\underline{T}$, with corresponding uncertainty $_1\underline{\varepsilon}$, the previous temperature data $_0\underline{T}$, with corresponding uncertainty $_0\underline{\varepsilon}$, and corresponding burner valve changes, $\Delta\underline{u}$, parameters $\alpha_1$, $\alpha_2$, $\alpha_3$, and $\alpha_4$, were re-estimated. Parameters $\alpha_1$, $\alpha_2$, $\alpha_3$, and $\alpha_4$ are re-estimated according to $$\underset{\alpha_1,\alpha_2,\alpha_3,\alpha_4}{\text{Min}} \left\| (_1\underline{T} - _0\underline{T}) - \underline{\underline{G}} \times \Delta\underline{u} \right) \cdot \left( \sqrt{(_1\underline{\varepsilon}^2 + _0\underline{\varepsilon}^2)} \right)^{-1} \right\|.$$

The final values of parameters $\alpha_1$, $\alpha_2$, $\alpha_3$, and $\alpha_4$, were 80(° C./%), −0.43, 0(° C./%), and 1, respectively.

Although the optimizer was not run to minimize them, the maximum probability values also improved from the initial values before adjustment. The initial temperature data showed that for all 0.305 m (1 ft.) sections k of any tube temperature $T_j$, there was a maximum probability of 37.0% of $T_{j,k}$ above the tube design limit, and for all of the pigtails, there was a maximum probability of 65.7% of $T_{j,pigtail}$ above the pigtail design limit. These values were reduced with the valve adjustments to a new maximum tube temperature probability of 2.2% for $T_{j,k}$ above the tube design limit, and for all of the pigtails, there was a new maximum probability of 9.9% of $T_{j,pigtail}$ above the pigtail design limit.

While only certain features and embodiments of the invention have been shown and described, many modifications and changes may occur to those skilled in the art (for example, variations in sizes, dimensions, structures, shapes and proportions of the various elements, values of parameters (for example, temperatures, pressures, etc.), mounting arrangements, use of materials, colors, orientations, etc) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

We claim:

1. A method of operating a furnace having a plurality of burners, each of the plurality of burners having flow rates associated therewith, the furnace containing a plurality of process tubes, the method comprising:
   (a) selecting target temperature criterion pertaining to the plurality of process tubes, wherein the target temperature criterion comprises a first objective function where the first objective function comprises calculated probabilities that temperatures pertaining to the plurality of process tubes exceed respective limit temperatures;
   (b) measuring first temperature information comprising data for each of the plurality of process tubes at a first operating condition wherein the first temperature information for the plurality of process tubes is measured by:
      capturing a first plurality of images of an interior area of the furnace, at least some images of the first plurality of images being associated with different portions of the interior area of the furnace, wherein each image of the first plurality of images comprises first pixel data associated with a portion of the plurality of process tubes; and
      processing a portion of the first pixel data to obtain the first temperature information for the plurality of process tubes;
   (c) providing an estimate of a mathematical function characterizing a relationship between burner flow rate changes for two or more of the plurality of burners and individual temperature changes for at least a portion of the plurality of process tubes;
   (d) calculating a first target flow rate solution set having solutions for the two or more of the plurality of burners consistent with conforming temperatures of the plurality of process tubes to the target temperature criterion for the plurality of process tubes using the estimate of the mathematical function and the first temperature information for the plurality of process tubes; and
   (e) adjusting a first valve upstream of at least one of the two or more of the plurality of burners to change at least one of the flow rates of the two or more of the plurality of burners in accordance with the first target flow rate solution set wherein the first valve is not upstream of all burners of the furnace.

2. The method according to claim 1 wherein the calculated probabilities that temperatures pertaining to the plurality of process tubes exceed respective limit temperatures are determined from the first temperature information.

3. The method according to claim 2 wherein the calculated probabilities that temperatures pertaining to the plurality of process tubes exceed respective limit temperatures are determined from weighted average values (e.g. mean, median, and/or mode) and variances calculated from the first temperature information.

4. The method according to claim 1 wherein the first objective function comprises at least one of a sum, maximum and/or a weighted average value of calculated probabilities that temperatures for the plurality of process tubes exceed respective limit temperatures.

5. The method according to claim 1 wherein the first objective function characterizes one or more of (i) the average mean probability of exceeding the limit temperatures for tube segments at a selected height or length of the process tubes in the furnace, (ii) the average mean probability that the process tubes exceed the limit temperatures for multiple segmented lengths of the process tubes, (iii) the maximum probability that the process tubes exceed the limit temperature for the process tubes, (iv) the average mean probability of exceeding the limit temperatures for the gas-transfer outlet tubes, and (v) the maximum probability that the gas-transfer outlet tubes exceed the limit temperature for the gas-transfer outlet tubes.

6. The method according to claim 1 wherein the target temperature criterion comprises a plurality of objective functions.

7. The method according to claim 6 wherein the plurality of objective functions includes the first objective function comprising calculated probabilities that temperatures for the plurality of process tubes exceed respective limit temperatures and a second objective function not including a calculated probability.

8. The method according to claim 1 wherein the limit temperatures are related to selected process tube design temperature limits.

9. The method according to claim 1 wherein the first objective function comprises calculated probabilities that temperatures pertaining to the plurality of process tubes exceed respective limit temperatures for a tube segment at a selected furnace elevation.

10. The method according to claim 1 wherein the first objective function comprises calculated probabilities that temperatures pertaining to the plurality of process tubes exceed respective limit temperatures of a corresponding plurality of gas-transfer outlet tubes connecting each respective tube of the plurality of process tubes to a collection header.

11. The method according to claim 1 wherein the furnace has an exhaust for withdrawing a combustion product gas stream and comprises a plurality of oxygen concentration sensors operatively disposed to sense the oxygen concentration in the combustion product gas stream, the plurality of oxygen concentration sensors spatially positioned to detect oxygen concentration changes responsive to changes in the flow rates of individual burners or groups of burners, the method further comprising:

selecting target oxygen concentration criterion pertaining to the plurality of oxygen concentration sensors;

measuring first oxygen concentration information comprising data for each of the plurality of oxygen concentration sensors at the first operating condition;

providing an estimate of a second mathematical function characterizing a relationship between burner flow rate changes for two or more of the plurality of burners and individual oxygen concentration changes for the plurality of oxygen concentration sensors; and calculating a first excess oxygen-related target flow rate solution set having solutions for the two or more of the plurality of burners consistent with conforming oxygen concentrations measured by the plurality of oxygen concentration sensors to the target oxygen concentration criterion for the plurality of oxygen concentration sensors using the estimate of the second mathematical function and the first oxygen concentration information;

wherein the first valve upstream of at least one of the two or more of the plurality of burners is adjusted to change at least one of the flow rates of the two or more of the plurality of burners in accordance with the first target flow rate solution set and the first excess oxygen-related target flow rate solution set.

12. The method according to claim 11 wherein the first valve is adjusted in accordance with the first target flow rate solution set and the second target flow rate solution set using a weighting function for the first target flow rate solution set and the second target flow rate solution set.

* * * * *